United States Patent
Cordi et al.

(10) Patent No.: US 12,118,127 B1
(45) Date of Patent: Oct. 15, 2024

(54) DATA STREAM INTEGRITY IN A TIERED BLOCKCHAIN STRUCTURE

(71) Applicant: SPLUNK INC., San Francisco, CA (US)

(72) Inventors: Christopher Cordi, San Francisco, CA (US); Nathaniel G. McKervey, Tallahassee, FL (US); Siegfried Puchbauer, San Francisco, CA (US); Antoine Toulme, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 412 days.

(21) Appl. No.: 17/514,738

(22) Filed: Oct. 29, 2021

(51) Int. Cl.
*G06F 21/64* (2013.01)
*H04L 9/00* (2022.01)
*H04L 9/32* (2006.01)

(52) U.S. Cl.
CPC ............ *G06F 21/64* (2013.01); *H04L 9/3236* (2013.01); *H04L 9/50* (2022.05)

(58) Field of Classification Search
CPC .......... G06F 21/64; H04L 9/3236; H04L 9/50
See application file for complete search history.

(56) References Cited

U.S. PATENT DOCUMENTS

| | | | |
|---|---|---|---|
| 10,255,342 B2 * | 4/2019 | Madisetti | G06F 16/27 |
| 11,228,445 B2 * | 1/2022 | Alger | H04L 9/0643 |
| 2014/0090016 A1 * | 3/2014 | Kruglick | H04L 63/08 726/3 |
| 2020/0027080 A1 * | 1/2020 | Holland | G06Q 20/36 |
| 2020/0242597 A1 * | 7/2020 | Baretta | G06Q 20/3823 |

* cited by examiner

*Primary Examiner* — John B King
*Assistant Examiner* — Alex D Carrasquillo
(74) *Attorney, Agent, or Firm* — Artegis Law Group, LLP

(57) ABSTRACT

A machine data validation system can track and validate the integrity of machine data generated by machines. The system can generate hashes for the items and batch hashes that can be validated using an immutable data store, such one or more blockchains in a tiered blockchain structure. The system can store machine data and additional associated data in a first lightweight blockchain, and store grouped sets of the data in a second robust blockchain. The system can implement the tiered blockchain structure to efficiently store and reference the hashes to validate the machine data at different times or upon request from an end-user.

20 Claims, 21 Drawing Sheets

| LIST ▾ | | |
|---|---|---|
| i | TIME | EVENT |
| > | 6/26/20 9:17:79.322 PM | "20679907","2020-01-01T00:00:00.000","LOCATION_1","MULTI CYLINDER","TRUE","27-33","M","MOTOR","1017727","233130","30.73397277900007","-73.77613313799993" BATCHHASH = EEA177 9771D7932DC377B79EA137C279E37E6A9A77FBDB INDEX = ACME_WIDGETS LATITUDE = 30.73397277900007 WIDGET_CLASS = MOTOR ⤹ 905 |
| > | 6/26/20 9:17:79.322 PM | "21177767","2020-03-27T00:00:00.000","109","ITEM 2,1,UNCLASSIFIED","106.0","ADV","PL 1200 7","0","27-33","M","MOTOR","997032","177797","30.63767007700037","-73.97033776299997" BATCHHASH = EEA177 9771D7932DC377B79EA137C279E37E6A9A77FBDB INDEX = ACME_WIDGETS LATITUDE = 30.63767007700037 WIDGET_CLASS = MOTOR ⤹ 910 |
| > | 6/26/20 9:17:77.322 PM | "21177 6917","2020-03-27T00:00:00.000","PUBLIC ADMINISTRATION,UNCLASSI","MISCELLANEOUS PENA B","F","K","67","0","37-63","M","MOTOR","999709","172030","30.63777119700003","-73.93393003 39 9997" BATCHHASH = EEA177 9771D7932DC377B79EA137C279E37E6A9A77FBDB INDEX = ACME_WIDGETS LATITUDE = 30.63777119700003 WIDGET_CLASS = MOTOR ⤹ 915 |
| > | 6/26/20 9:17:77.322 PM | "20679906","2020-01-01T00:00:00.000","LOCATION_2","23","0",,"TRUE","27-33","M","MOTOR","27-33 2","230396","30.79933779700003","I","-73.96097631399997" INDEX = ACME_WIDGETS BATCHHASH = EEA177 9771D7932DC377B79EA137C279B37E6A9A77FBDB LATITUDE = 30.79933779700003 WIDGET_CLASS = MOTOR |
| > | 6/26/20 9:17:77.222 PM | "206909222","2020-01-02T00:00:00.000","03:10:00","LOCATION_3","FALSE",,,"27-33","M","MOTOR","10 6739223 9010 0007","-73.9377176129 9997" BATCHHASH = EEA177 9771D7932DC377B79EA137C279E37E6A9A77FBDB INDEX = ACME_WIDGETS LATITUDE = 30.67392390100007 ⤹ 920 |

*FIG. 9*

| TIME | EVENT |
|---|---|
| 6/12/19 9:18:59.433 PM | "306898908","3030-01-01T00:00:00.000","10:39:00","LOCATION_1" -44","M","MOTOR","1018538","343130","40.8339538890008"," |

EVENT ACTIONS ▽

VERIFY EVENT INTEGRITY  ← 1005
BUILD EVENT TYPE
EXTRACT FIELDS
SHOW SOURCE

| | | VALUE |
|---|---|---|
| ☐ | WIDGET_CLASS ▽ | EEA1859881D5943DC355B |
| ☐ | BATCHINTEGRITY ▽ | ACME_WIDGETS |
| | | 40.8339538890008 |
| | | MOTOR |
| ☐ | | EEA1859881D5943DC355B |
| ☐ | PLACE ▽ | LOCATION_1 |
| ☐ | INCIDENT_KEY ▽ | 306898908 |

*FIG. 10*

| | |
|---|---|
| TRANSACTION HASH: | 0X2545D10F150B2F6F86B4540C2C52F5552A0285C |
| STATUS: | ⊙ SUCCESS |
| BLOCK: | 6516841  > 25 BLOCK CONFIRMATIONS |
| TIMESTAMP: | ⊙ 21 MINS AGO |
| FROM: | 0XAD1FB1F5265B605B8605B8605BAA |
| TO: | CONTRACT 0X41EDB012105ACE56C8556C520D20 |
| TRANSACTION FEE: | 0.0000221105 ETHER |

FIG. 13

| ⚠ VERIFICATION FAILED! | | |
|---|---|---|
| POSSIBLE DATA TAMPERING | EVENT COUNT | STATUS |
| 03B56CD7C1573AE0D60A05C58E73EF368... | 10 | ⊘ |
| 05DE6330137CF680736D6530580E807A07... | 10 | ⊘ |
| 0686578317F3E70F37D86EAA37E86D03A... | 8 | ⊟ |
| 06FA8DA80C85CCCE53BD737A103D3EAB... | 10 | ⊘ |
| 13C73B1C011060731E3F8ACFCDFF1165E... | 10 | ⊘ |
| 15BAD8733DACD083773E8D060358B7713... | 10 | ⊘ |
| 17B37780D3D6E333E873C5E7B8F7658AA... | 10 | ⊘ |
| 1ECAF61FB3BBB331ACB3C85883EE8717... | 10 | ⊘ |
| 1F0B3BE583E78EF5D0765377D5DF881F5D... | 10 | ⊘ |
| 38ED07EF3A837BBB3A371F8FB17B7D855 | 10 | ⊘ |

*FIG. 14*

DATA STREAM INTEGRITY IN A TIERED BLOCKCHAIN STRUCTURE

TECHNICAL FIELD

The present disclosure generally relates to special-purpose machines that provide data management and improvements to such variants, and to the technologies by which such special-purpose machines become improved compared to other special-purpose machines for managing data using one or more blockchains.

BACKGROUND

It can be difficult to ensure that data generated by one or more machines has not been modified, deleted, or otherwise tampered with. While blockchain can enable immutable data management, interacting with a blockchain to record large amounts of data items is not practical because each chain interaction can be too time consuming and the cost of the interactions (e.g., crypto-currency cost to interact on chain) can exceed what is available or practical.

BRIEF DESCRIPTION OF THE DRAWINGS

Various ones of the appended drawings merely illustrate example embodiments of the present disclosure and should not be considered as limiting its scope.

FIG. 9 shows an example user interface displaying grouped items, according to some example embodiments.

FIG. 10 shows an example user interface for generating a validation request, according to some example embodiments.

FIG. 13 shows a user interface of a network site for viewing blockchain data that stores batch hash information, according to some example embodiments.

FIG. 14 shows an example user interface for validation of an entire data set using the machine data validation system, according to some example embodiments.

DETAILED DESCRIPTION

Figure 1:
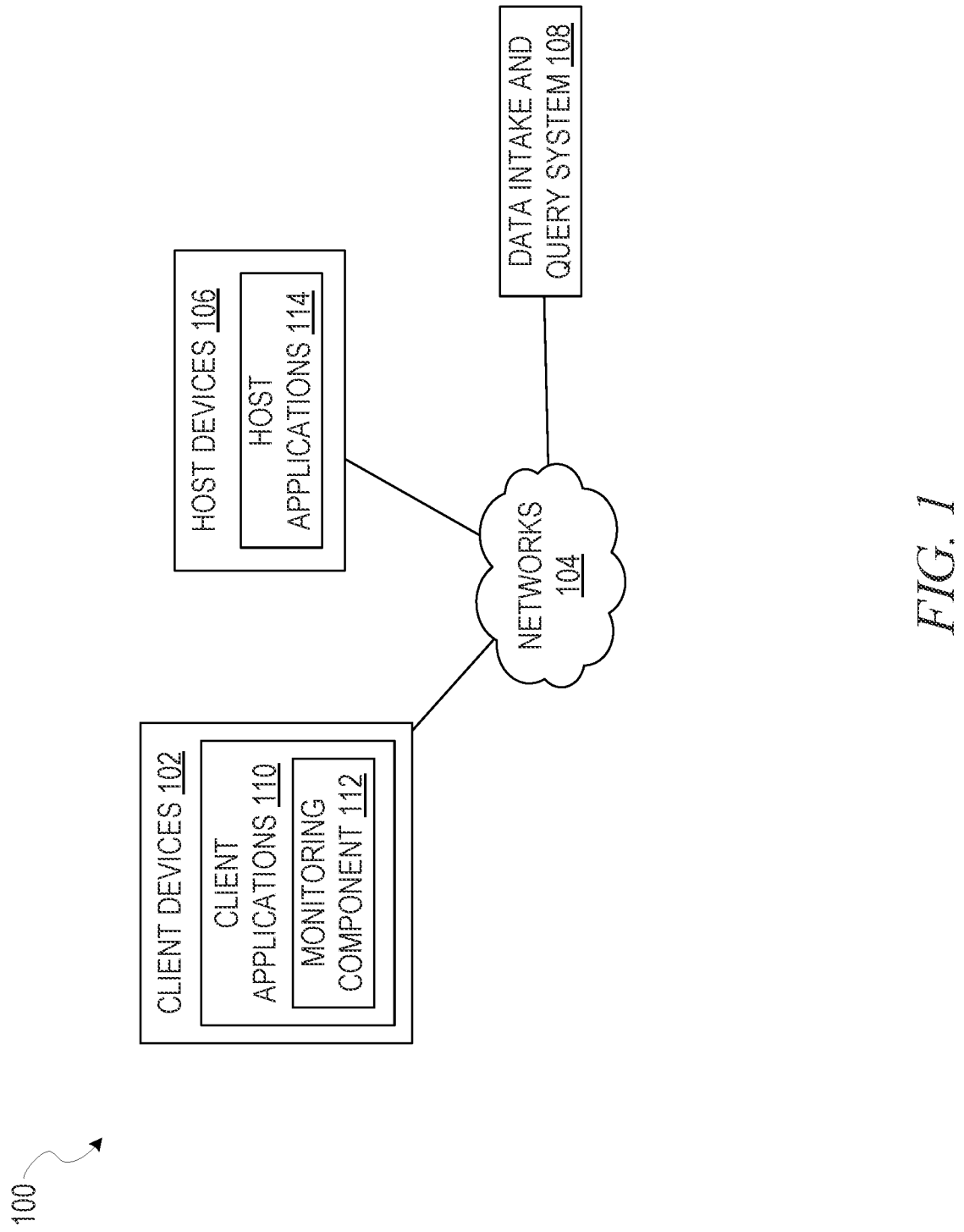
FIG. 1 is a block diagram of an example networked computer environment, in accordance with example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed, it can be difficult to track large amounts of data in blockchains in a computationally efficient approach. To this end, a machine data validation system can be implemented to track and validate data from one or more machines using blockchain interactions in a secure and computationally efficient manner. In some example embodiments, each item of machine data to be tracked (e.g., log data, sensor data, database data, network device generated data, hardware appliance generated data, vehicle data) is first hashed by the machine data validation system. The resulting group of hashes are sorted and hashed together to generate a batch hash. Any change to any of the data items (e.g., tampering) will change that item's hash and further change the batch hash thereby indicating that the data has been changed.

The batch hash can be recorded on a blockchain (e.g., a permissionless blockchain, a permissioned or private blockchain) and the batch hash is added to the items to create grouped machine items. In response to a validation request, such as a request to validate a specific grouped machine item of data, the batch hash from that item is first identified and used to retrieve other items in the group (e.g., other items having the same batch hash). The machine data validation system removes the batch hash from each item in the group (thereby converting a given grouped item into its original raw machine data item form for re-hashing). The machine data validation system then re-generates the hashes for each of the items, sort the hashes, and then generate a new batch hash.

To confirm the data has not been modified, the blockchain-stored batch hash is retrieved from a block in a blockchain and compared against the newly regenerated batch hash. If the newly regenerated batch hash matches the blockchain-retrieved batch hash, then the machine data validation system determines that the data has not been tampered with and is valid. Alternatively, if the newly regenerated batch hash does not match the blockchain-retrieved batch hash, then the machine data validation system can output a validation error and perform further analysis (e.g., specific regeneration of each item) to determine which machine data item has been tampered with or otherwise modified.

In some example embodiments, each item is hashed, sorted, grouped, and an initial batch hash is recorded to a lightweight, fast, and less immutable blockchain, such as a custom blockchain (e.g., a private blockchain having nodes authorized and managed within a private network, fast block rate, fast consensus mechanism, low instruction surface attack area). Further, after a plurality of initial batch hashes are generated, they are sorted and hashed together to generate a grouped batch hash, which is recorded on a more robust but usually slower blockchain that is highly immutable, such as a permissionless blockchain (e.g., a public blockchain having independent public nodes, such as Bitcoin, Ethereum, or layer-2 interfaces built thereon such as Bitcoin Lightning). In this way, highly granular and computationally inexpensive batch hashes can validate smaller groups of data items more frequently, while computationally expensive batch hashes can ensure high immutability for larger groups of the data items using infrequent on-chain interactions.

FIG. 1 is a block diagram of an example networked computer environment 100, in accordance with example embodiments. It will be understood that FIG. 1 represents one example of a networked computer system and other embodiments may use different arrangements. The networked computer environment 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some embodiments, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

In the illustrated embodiment, the networked computer environment 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. In some example embodiments, a host application 114 comprising a database server may generate one or more logs that record information related to requests sent from other host applications 114 (e.g., web servers or application servers) for data managed by the database server. Further, in some example embodiments, the host devices 106 comprise one or more hardware devices that generate data from one or more sensors (e.g., vehicles, home appliances).

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

In some embodiments, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In some embodiments, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In some embodiments, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself. In some embodiments, an SDK or other code for implementing the monitoring functionality may be offered by a provider of a data intake and query system, such as a data intake and query system 108. In such cases, the provider of the data intake and query system 108 can implement the custom code so that performance data generated by the monitoring functionality is sent to the data intake and query system 108 to facilitate analysis of the performance data by a developer of the client application or other users.

In some embodiments, network performance data refers to any type of data that indicates information about the network and/or network performance. Network performance data may include, for instance, a URL requested, a connection type (e.g., HTTP, HTTPS), a connection start time, a connection end time, an HTTP status code, request length, response length, request headers, response headers, connection status (e.g., completion, response time(s), failure), and the like. Upon obtaining network performance data indicating performance of the network, the network performance data can be transmitted to a data intake and query system 108 for analysis and validation (e.g., blockchain based integrity analysis).

The data intake and query system 108 can process and store machine data received from the data sources, such as the client devices 102 or host devices 106, and execute queries on the data in response to requests received from one or more computing devices (e.g., data integrity requests). In some cases, the data intake and query system 108 can generate events from the received data and store the events in buckets in a common storage system. In response to received queries, the data intake and query system 108 can assign one or more search nodes to search the buckets in the common storage.

Figure 2:
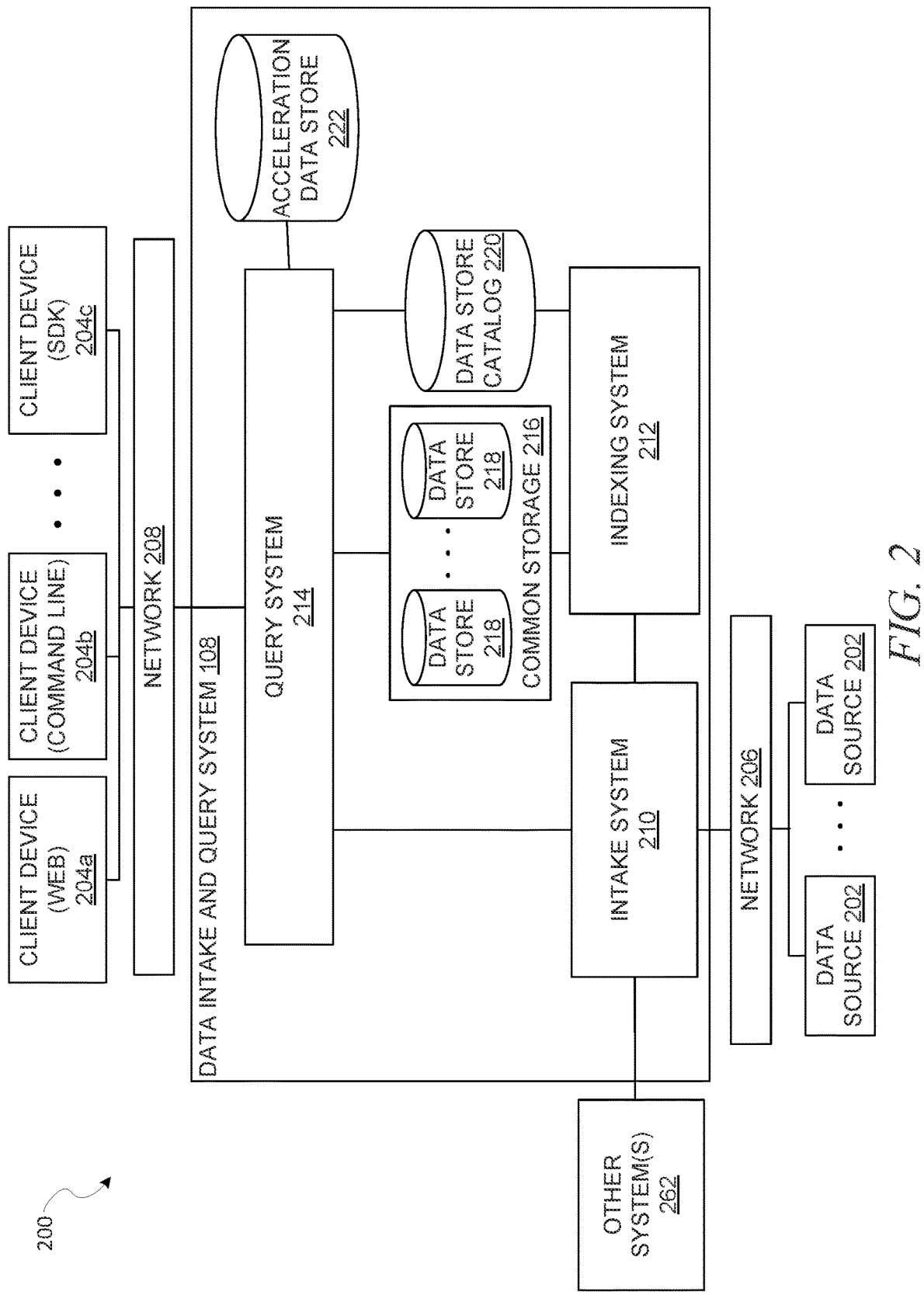
FIG. 2 is a block diagram of an example data intake and query system, in accordance with example embodiments.

FIG. 2 is a block diagram of an embodiment of a data processing environment 200, in accordance with some example embodiments. In the illustrated embodiment, the environment 200 includes data sources 202 and client devices 204a, 204b, 204c (generically referred to as client device(s) 204) in communication with the data intake and query system 108 via networks 206, 208, respectively. The networks 206, 208 may be the same network, may correspond to the network 104, or may be different networks. Further, the networks 206, 208 may be implemented as one or more LANs, WANs, cellular networks, intranetworks, and/or internetworks using any of wired, wireless, terrestrial microwave, satellite links, etc., and may include the Internet.

Each data source 202 broadly represents a distinct source of machine data that can be consumed by the data intake and query system 108. Examples of data sources 202 include, without limitation, data files, directories of files, data sent over a network, event logs, registries, streaming data services (examples of which can include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud PubSub, devices implementing the Java Message Service (JMS) protocol, devices implementing the Advanced Message Queuing Protocol (AMQP)), performance metrics, etc.

The client devices 204 can be implemented using one or more computing devices in communication with the data intake and query system 108, and represent some of the different ways in which computing devices can submit queries to the data intake and query system 108. For example, in FIG. 2, the client device 204a communicates over an Internet (Web) protocol with the data intake and query system 108, the client device 204b communicates with the data intake and query system 108 via a command line interface, and the client device 204c communicates with the data intake and query system 108 via a software developer kit (SDK), in accordance with some example embodiments. However, it will be understood that the client devices 204 can communicate with and submit queries to the data intake and query system 108 in a variety of ways.

The data intake and query system 108 can process and store data received data from the data sources 202 and execute queries on the data in response to requests received from the client devices 204. In the illustrated embodiment, the data intake and query system 108 includes an intake system 210, an indexing system 212, a query system 214, common storage 216 including one or more data stores 218, a data store catalog 220, and a query acceleration data store 222.

In some example embodiments, the intake system 210 can receive data from the data sources 202, perform one or more preliminary processing operations on the data, and communicate the data to the indexing system 212, query system 214, or to other systems 262 (which may include, for example, data processing systems, telemetry systems, real-time analytics systems, data stores, databases, etc., any of which may be operated by an operator of the data intake and query system 108 or a third party). The intake system 210 can receive data from the data sources 202 in a variety of formats or structures. In some embodiments, the received data corresponds to raw machine data, structured or unstructured data, correlation data, data files, directories of files, data sent over a network, event logs, registries, messages published to streaming data sources, performance metrics, sensor data, image, and video data, etc. The intake system 210 can process the data based on the form in which it is received. In some cases, the intake system 210 can utilize one or more rules to process data and to make the data available to downstream systems (e.g., the indexing system 212, query system 214).

As will be described in greater detail herein, at least with reference to FIG. 4, the indexing system 212 can process the data and store it, for example, in the common storage 216. As part of processing the data, the indexing system 212 can identify timestamps associated with the data, organize the data into buckets or time series buckets, convert editable buckets to non-editable buckets, store copies of the buckets in common storage 216, merge buckets, generate indexes of the data, etc. In addition, the indexing system 212 can update the data store catalog 220 with information related to the buckets (pre-merged or merged) or data that is stored in the common storage 216, and can communicate with the intake system 210 about the status of the data storage.

As will be described in greater detail herein, at least with reference to FIG. 5, the query system 214 can receive queries that identify a set of data to be processed and a manner of processing the set of data from one or more client devices 204, process the queries to identify the set of data, and execute the query on the set of data. In some cases, as part of executing the query, the query system 214 can use the data store catalog 220 to identify the set of data to be processed or its location in common storage 216 and/or can retrieve data from common storage 216 or the query acceleration data store 222. In addition, in some embodiments, the query system 214 can store some or all of the query results in the query acceleration data store 222.

As mentioned and as will be described in greater detail below, the common storage 216 can be made up of one or more data stores 218 storing data that has been processed by the indexing system 212. The common storage 216 can be configured to provide high availability, highly resilient, low loss data storage. In some cases, to provide the high availability, highly resilient, low loss data storage, the common storage 216 can store multiple copies of the data in the same and different geographic locations and across different types of data stores (e.g., solid state, hard drive, tape). Further, as data is received at the common storage 216, it can be automatically replicated multiple times according to a replication factor to different data stores across the same and/or different geographic locations. In some embodiments, the common storage 216 can correspond to cloud storage, such as Amazon Simple Storage Service (S3) or Elastic Block Storage (EBS), Google Cloud. Storage, Microsoft Azure Storage, etc.

The query acceleration data store 222 can store the results or partial results of queries, or otherwise be used to accelerate queries. For example, if a user submits a query that has no end date, the query system 214 can store an initial set of results in the query acceleration data store 222. As additional query results are determined based on additional data, the additional results can be combined with the initial set of results, and so on. In this way, the query system 214 can avoid re-searching all of the data that may be responsive to the query and instead search the data that has not already been searched.

Figure 3:
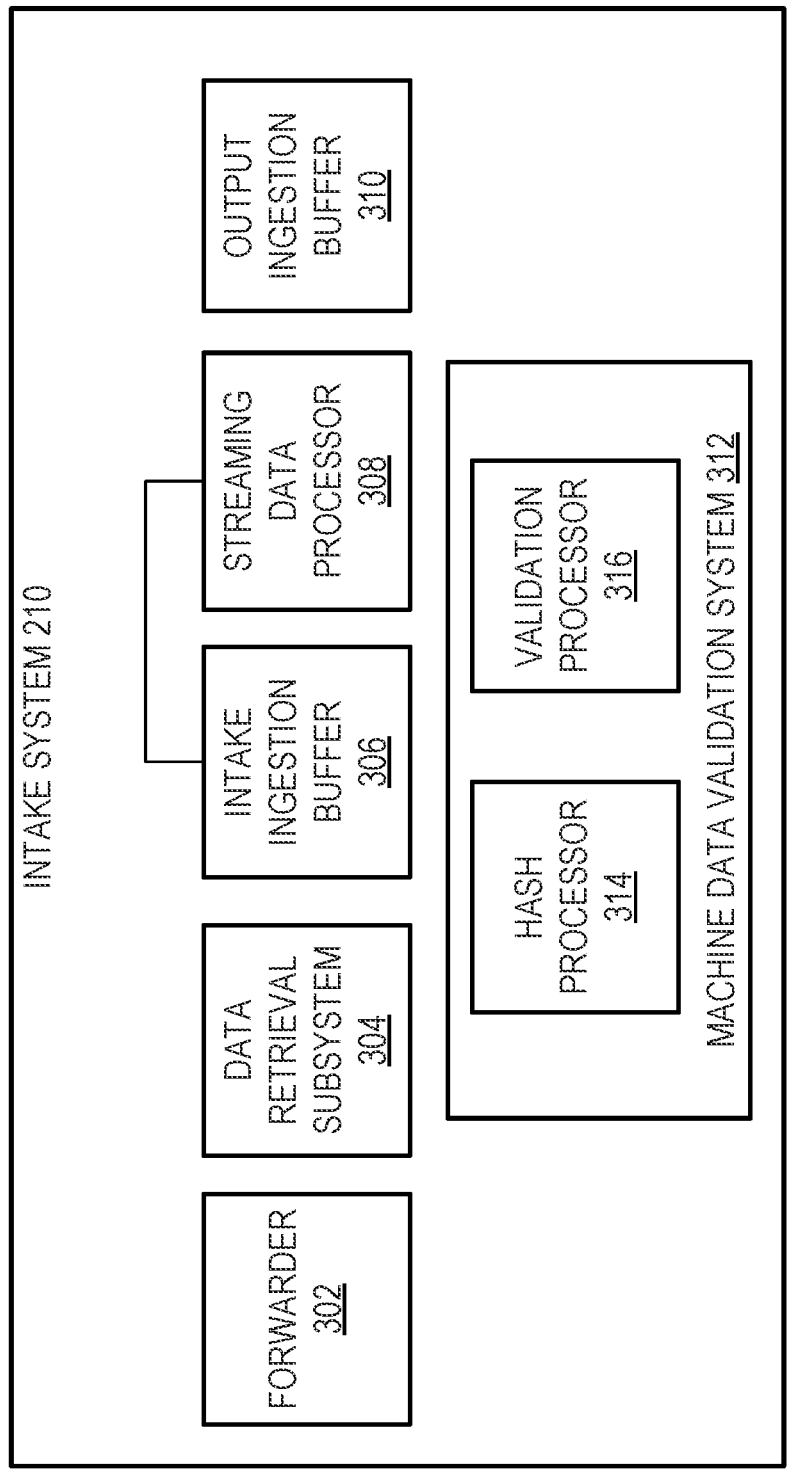
FIG. 3 is a block diagram of one embodiment of an intake system, according to some example embodiments.

FIG. 3 shows an example architecture of the intake system 210, in accordance with some example embodiments. As illustrated, the intake system 210 includes a forwarder 302, a data retrieval subsystem 304, an intake ingestion buffer 306, a streaming data processor 308, an output ingestion buffer 310, and a machine data validation system 312. As described in detail below, the components of the intake system 210 may be configured to process data according to a streaming data model, such that data ingested into the data intake and query system 108 is processed rapidly (e.g., within seconds or minutes of initial reception at the intake system 210) and made available to downstream systems or components. Although shown as separate components, the forwarder 302, data retrieval subsystem 304, intake ingestion buffer 306, streaming data processor 308, output ingestion buffer 310, and machine data validation system 312, in various embodiments, may reside on the same machine or be distributed across multiple machines in any combination.

In some embodiments, some or all of the elements of the intake system 210 (e.g., forwarder 302, data retrieval subsystem 304, intake ingestion buffer 306, streaming data processors 308, output ingestion buffer 310, machine data validation system 312) may reside on one or more computing devices, such as servers, which may be communicatively coupled with each other and with the data sources 202, query system 214, indexing system 212, or other components. In other embodiments, some or all of the elements of the intake system 210 may be implemented as worker nodes of a cluster computing environment. Further, in some example embodiments, some or all the elements of the intake system can be integrated as client side component (e.g., a plugin integrated in client applications 110). For example, the machine data validation system 312 can be implemented as a plugin in a client side application, for local validation processing (e.g., items are sent to the client device 102 for computation of hashes and batch hashes for local validation and data integrity checking) and local blockchain-based interactions (e.g., web browser-based blockchain interactions that retrieve blockchain-stored batch hashes, MetaMask).

As noted above, the intake system 210 can function to conduct preliminary processing of data ingested at the data intake and query system 108. As such, the intake system 210 illustratively includes a forwarder 302 that obtains data from a data source 202 and transmits the data to a data retrieval subsystem 304. The data retrieval subsystem 304 may be configured to convert or otherwise format data provided by the forwarder 302 into an appropriate format for inclusion at the intake ingestion buffer 306 and transmit the message to the intake ingestion buffer 306 for processing. Thereafter, a streaming data processor 308 may obtain data from the intake ingestion buffer 306, process the data according to one or more rules, and republish the data to either the intake ingestion buffer 306 (e.g., for additional processing) or to the output ingestion buffer 310, such that the data is made available to downstream components or systems. In this manner, the intake system 210 may repeatedly or iteratively process data according to any of a variety of rules, such that the data is formatted for use on the data intake and query system 108 or any other system. As discussed below, the intake system 210 may be configured to conduct such processing rapidly (e.g., in "real-time" with little or no perceptible delay), while ensuring resiliency of the data.

The forwarder 302 can include or be executed on a computing device configured to obtain data from a data source 202 and transmit the data to the data retrieval subsystem 304. In some example embodiments, the intake system 210 may include a number of different forwarders 302. Each forwarder 302 may illustratively be associated with a different data source 202. A forwarder 302 initially may receive the data as a raw data stream generated by the data source 202. For example, a forwarder 302 may receive a data stream from a log file generated by an application server, from a stream of network data from a network device, or from any other source of data. In some embodiments, a forwarder 302 receives the raw data and may segment the data stream into "chunks," possibly of a uniform data size, to facilitate subsequent processing steps. The forwarder 302 may additionally or alternatively modify data received, prior to forwarding the data to the data retrieval subsystem 304. Illustratively, the forwarder 302 may "tag" metadata for each data chunk, such as by specifying a source, source type, or host associated with the data, or by appending one or more timestamp or time ranges to each data chunk.

The data retrieval subsystem 304 illustratively corresponds to a computing device which obtains data (e.g., from the forwarder 302), and transforms the data into a format suitable for publication on the intake ingestion buffer 306. Illustratively, where the forwarder 302 segments input data into discrete blocks, the data retrieval subsystem 304 may generate a message for each chunk (block), and publish the message to the intake ingestion buffer 306. Generation of the message may include "tagging" the message with information (e.g., a batch hash), which may be included as metadata for the data provided by the forwarder 302, and determining a "topic" for the message, under which the message should be published to the intake ingestion buffer 306. In general, the "topic" of a message may reflect a categorization of the message on a streaming data system. Illustratively, each topic may be associated with a logically distinct queue of messages, such that a downstream device or system may "subscribe" to the topic in order to be provided with messages published to the topic on the streaming data system.

The intake system 210 includes at least two logical ingestion buffers: an intake ingestion buffer 306 and an output ingestion buffer 310, according to some example embodiments. As noted above, the intake ingestion buffer 306 can be configured to receive messages from the data retrieval subsystem 304 and resiliently store the message. The intake ingestion buffer 306 can further be configured to transmit the message to the streaming data processors 308 for processing. As further described below, the streaming data processors 308 can be configured with one or more data transformation rules to transform the messages, and republish the messages to one or both of the intake ingestion buffer 306 and the output ingestion buffer 310. The output ingestion buffer 310, in turn, may make the messages available to various subscribers to the output ingestion buffer 310, which subscribers may include the query system 214, the indexing system 212, or other third-party devices (e.g., client devices 102, host devices 106).

Both the intake ingestion buffer 306 and output ingestion buffer 310 may be implemented on a streaming data source, as noted above. In one embodiment, the intake ingestion buffer 306 operates to maintain source-oriented topics, such as topics for each data source 202 from which data is obtained, while the output ingestion buffer 310 operates to maintain content-oriented topics, such as topics to which the data of an individual message pertains. As discussed in more detail below, the streaming data processors 308 can be configured to transform messages from the intake ingestion buffer 306 (e.g., arranged according to source-oriented topics) and publish the transformed messages to the output ingestion buffer 310 (e.g., arranged according to content-oriented topics). In some instances, the streaming data processors 308 may additionally or alternatively republish transformed messages to the intake ingestion buffer 306, enabling iterative or repeated processing of the data within the message by the streaming data processors 308.

The machine data validation system 312 manages tracking items (e.g., using hashes and batch hashes) and validation requests, according to some example embodiments. In the example illustrated in FIG. 3, the machine data validation system 312 comprises a hash processor 314 and a validation processor 316. The hash processor 314 manages generating hashes from item data and generating batch hashes. The validation processor 316 manages receiving validation requests, identifying data to be revalidated (e.g., items in a given group, each having the same batch hash), and validating one or more data sets. In some example embodiments, one or both of the hash processor 314 and the validation processor 316 can include a full node of a blockchain that enables the machine data validation system 312 to interact with a blockchain (e.g., generate a transaction on a public blockchain or private blockchain). Although in the example of FIG. 3, the machine data validation system 312 is illustrated as integrated in the intake system 210, in some example embodiments, different instances of the machine data validation system 312 are integrated in other systems of the data intake and query system 108 or the client side (e.g., within client applications 110). For example, a validation processor 316 can be implemented on the client side (e.g., as a browser extension) from which an end-user can request validation of a given item, receive items batched with the specified item for validation, and recompute and verify each hash and batch hash locally on the client side machine (e.g., client devices 102).

Figure 4:
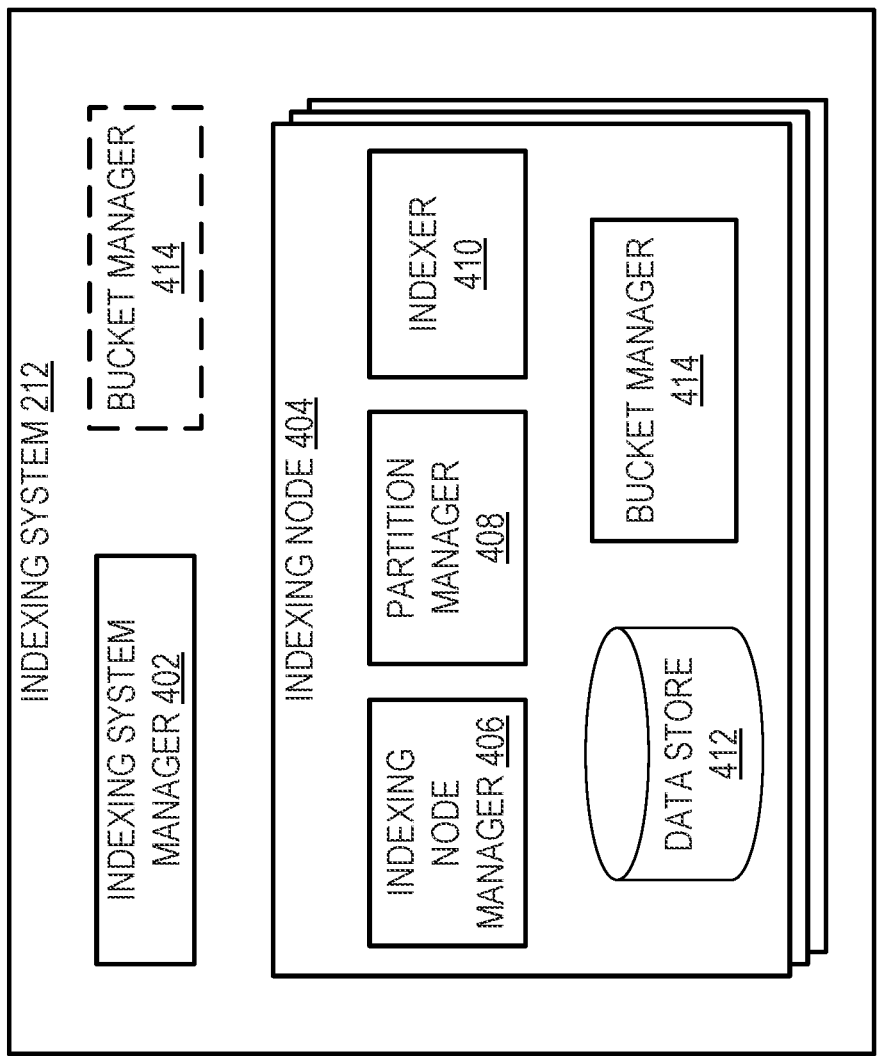
FIG. 4 is a block diagram illustrating an embodiment of an indexing system of the data intake and query system, in accordance with example embodiments.

FIG. 4 is a block diagram illustrating an embodiment of the indexing system 212 of the data intake and query system 108. The indexing system 212 can receive, process, and store data from multiple data sources 202, which may be associated with different tenants, users, etc. Using the received data, the indexing system 212 can generate events that include a portion of machine data associated with a timestamp and store the events in buckets based on one or more of the timestamps, tenants, indexes, etc., associated with the data.

In the illustrated embodiment, the indexing system 212 includes an indexing system manager 402 and one or more indexing nodes 404. The indexing system manager 402 can monitor and manage the indexing nodes 404, and can be implemented as a distinct computing device, virtual machine, container, container of a pod, or a process or thread associated with a container. In certain embodiments, the indexing system 212 can include one indexing system manager 402 to manage all indexing nodes 404 of the indexing system 212. In some embodiments, the indexing system 212 can include multiple indexing system managers 402. The indexing system manager 402 can handle resource management, creation/destruction of indexing nodes 404, high availability, load balancing, application upgrades/rollbacks, logging and monitoring, storage, networking, service discovery, and performance and scalability, and otherwise handle containerization management of the containers of the indexing system 212. In certain embodiments, the indexing system manager 402 can be implemented using Kubernetes or Swarm.

In the illustrated embodiment, the indexing node 404 includes an indexing node manager 406, partition manager 408, indexer 410, data store 412, and bucket manager 414. The indexing node manager 406 can manage the processing of the various streams or partitions of data by the indexing node 404, and can be implemented as a distinct computing device, virtual machine, container, container of a pod, or a process or thread associated with a container. In some embodiments, the indexing node manager 406 monitors the various shards of data being processed by the indexing node 404 and read pointers or location markers for those shards. In some embodiments, the indexing node manager 406 stores the read pointers or location marker in one or more data stores, such as but not limited to, the common storage 216, DynamoDB, S3, or another type of storage system, shared storage system, or networked storage system, etc.

The partition manager(s) 408 can manage the processing of one or more of the partitions or shards of a data stream processed by the indexing node 404 or the indexer 410 of the indexing node 404, and can be implemented as a distinct computing device, virtual machine, container, container of a pod, or a process or thread associated with a container. In some cases, managing the processing of a partition or shard can include, but it not limited to, communicating data from a particular shard to the indexer 410 for processing, monitoring the indexer 410 and the size of the data being processed by the indexer 410, instructing the indexer 410 to move the data to common storage 216, and reporting the storage of the data to the intake system 210.

The indexer 410 can be the primary indexing execution engine, and can be implemented as a distinct computing device, container, container within a pod, in accordance with some example embodiments. For example, the indexer 410 can be tasked with parsing, processing, indexing, and storing the data received from the intake system 210 via the partition manager(s) 408. In some embodiments, the indexer 410 can store the events and buckets in the data store 412 according to a bucket creation policy.

The bucket creation policy can indicate how many buckets the indexer 410 is to generate for the data that it processes. As described herein, buckets in the data store 412 that are being edited by the indexer 410 can be referred to as hot buckets or editable buckets. For example, the indexer 410 can add data, events, and indexes to editable buckets in the data store 412, etc. Buckets in the data store 412 that are no longer edited by the indexer 410 can be referred to as warm buckets or non-editable buckets. In some embodiments, once the indexer 410 determines that a hot bucket is to be copied to common storage 216, it can convert the hot (editable) bucket to a warm (non-editable) bucket, and then move or copy the warm bucket to the common storage 216. Once the warm bucket is moved or copied to common storage 216, the indexer 410 can notify the partition manager 408 that the data associated with the warm bucket has been processed and stored.

The bucket manager 414 can manage the buckets stored in the data store 412, and can be implemented as a distinct computing device, virtual machine, container, container of a pod, or a process or thread associated with a container. In some cases, the bucket manager 414 can be implemented as part of the indexer 410, indexing node 404, or as a separate component of the indexing system 212.

The bucket merge policy can indicate which buckets are candidates for a merge or which bucket to merge (e.g., based on time ranges, size, tenant/partition or other identifiers), the number of buckets to merge, size or time range parameters for the merged buckets, and/or a frequency for creating the merged buckets. For example, the bucket merge policy can indicate that a certain number of buckets are to be merged, regardless of size of the buckets. As another non-limiting example, the bucket merge policy can indicate that multiple buckets are to be merged until a threshold bucket size is reached (e.g., 750 MB, or 1 GB, or more). As yet another non-limiting example, the bucket merge policy can indicate that buckets having a time range within a set period of time (e.g., 30 sec, 1 min.) are to be merged, regardless of the number or size of the buckets being merged.

In addition, the bucket merge policy can indicate which buckets are to be merged or include additional criteria for merging buckets. For example, the bucket merge policy can indicate that only buckets having the same tenant identifier and/or partition are to be merged, or set constraints on the size of the time range for a merged bucket (e.g., the time range of the merged bucket is not to exceed an average time range of buckets associated with the same source, tenant, partition).

In some example embodiments, the bucket management policy can indicate that once queries using the pre-merged buckets are completed, the buckets are to be removed from common storage 216. However, it will be understood that the bucket management policy can indicate removal of the buckets in a variety of ways. For example, per the bucket management policy, the common storage 216 can remove the buckets after one or more hours, one day, one week, etc., with or without regard to queries that may be relying on the pre-merged buckets. In some embodiments, the bucket management policy can indicate that the pre-merged buckets are to be removed without regard to queries relying on the pre-merged buckets and that any queries relying on the pre-merged buckets are to be redirected to the merged bucket.

Figure 5:
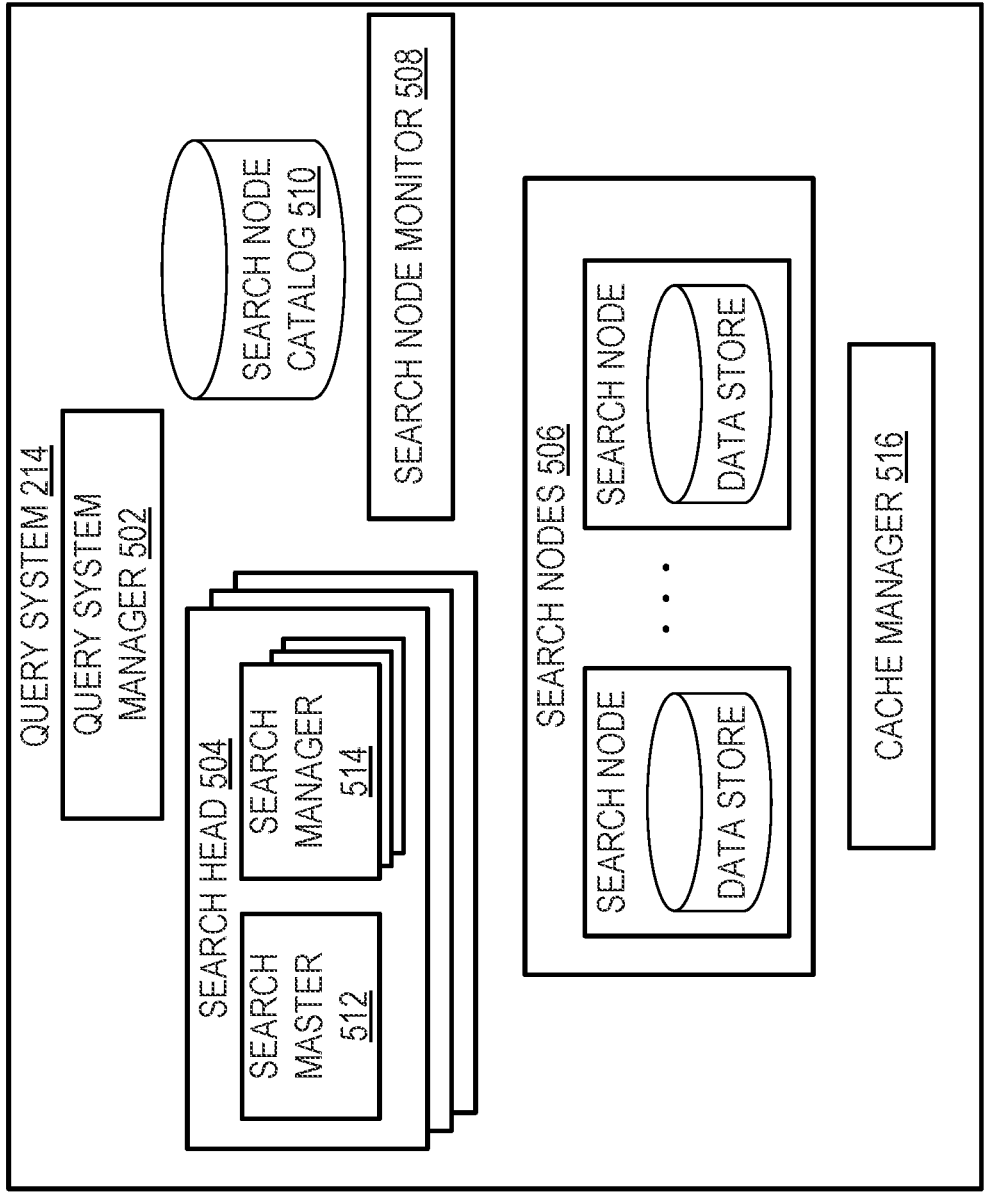
FIG. 5 is a block diagram illustrating an embodiment of a query system of the data intake and query system.

FIG. 5 is a block diagram illustrating an embodiment of the query system 214 of the data intake and query system 108. The query system 214 can receive, process, and execute queries from multiple client devices 204. In the illustrated embodiment, the query system 214 includes one or more query system managers 502 (collectively or individually referred to as query system manager 502), one or more search heads 504 (collectively or individually referred to as search head 504 or search heads 504), one or more search nodes 506 (collectively or individually referred to as search node 506 or search nodes 506), a search node monitor 508, and a search node catalog 510.

The query system manager 502 can monitor and manage the search heads 504 and search nodes 506, and can be implemented as a distinct computing device, virtual machine, container, container of a pod, or a process or thread associated with a container. For example, the query system manager 502 can determine which search head 504 is to handle an incoming query or determine whether to generate an additional search node 506 based on the number of queries received by the query system 214 or based on another search node 506 becoming unavailable or unresponsive.

In some example embodiments, the query system manager 502 can handle resource management, creation, assignment, or destruction of search heads 504 and/or search nodes 506, high availability, load balancing, application upgrades/rollbacks, logging and monitoring, storage, networking, service discovery, and performance and scalability, and otherwise handle containerization management of the containers of the query system 214. In certain embodiments, the query system manager 502 can be implemented using Kubernetes or Swarm. For example, in certain embodiments, the query system manager 502 may be part of a sidecar or sidecar container, that allows communication between various search nodes 506, various search heads 504, and/or combinations thereof.

The search heads 504 can manage the execution of queries received by the query system 214. For example, the search heads 504 can parse the queries to identify the set of data to be processed and the manner of processing the set of data, identify the location of the data, identify tasks to be performed by the search head 504 and tasks to be performed by the search nodes 506, distribute the query (or sub-queries corresponding to the query) to the search nodes 506, apply extraction rules to the set of data to be processed, aggregate search results from the search nodes 506, store the search results in the query acceleration data store 222, etc. In some embodiments, the search heads 504 may be implemented using multiple-related containers. In certain embodiments, such as in a Kubernetes deployment, each search head 504 can be implemented as a separate container or pod. For example, one or more of the components of the search head 504 can be implemented as different containers of a single pod (e.g., on a containerization platform), such as Docker, and the one or more components of the indexing node 404 can be implemented as different Docker containers managed by synchronization platforms such as Kubernetes or Swarm.

A search master 512 can manage the execution of the various queries assigned to the search head 504, and can be implemented as a distinct computing device, virtual machine, container, container of a pod, or a process or thread associated with a container. For example, in certain embodiments, as the search head 504 is assigned a query, the search master 512 can generate one or more search manager(s) 514 to manage the query. The search master 512 can track and store the queries assigned to the different search managers 514.

The search managers 514 can manage the processing and execution of the queries assigned to the search head 504, and can be implemented as a distinct computing device, virtual machine, container, container of a pod, or a process or thread associated with a container. In some embodiments, one search manager 514 manages the processing and execution of one query at a time. In such embodiments, if the search head 504 is processing one hundred queries, the search master 512 can generate one hundred search managers 514 to manage the one hundred queries. Upon completing an assigned query, the search manager 514 can await assignment to a new query or be terminated.

In some cases, to aid in identifying the set of data to be processed, the search manager 514 can consult the data store catalog 220 (depicted in FIG. 2). As described herein, the data store catalog 220 can include information regarding the data stored in the common storage 216. In some cases, the data store catalog 220 can include bucket identifiers, a time range, and a location of the buckets in the common storage 216. In addition, the data store catalog 220 can include a tenant identifier and partition identifier for the buckets. This information can be used to identify buckets that include data that satisfies at least a portion of the query.

In certain embodiments, a search node mapping policy can indicate that the search manager 514 is to use a consistent hash function or other function to consistently map a bucket to a particular search node 506. The search manager 514 can perform the hash using the bucket identifier obtained from the data store catalog 220, and the output of the hash can be used to identify the search node 506 assigned to the bucket. In some cases, the consistent hash function can be configured such that even with a different number of search nodes 506 being assigned to execute the query, the output will consistently identify the same search node 506, or have an increased probability of identifying the same search node 506.

In some embodiments, the query system 214 can store a mapping of search nodes 506 to bucket identifiers. The search node mapping policy can indicate that the search manager 514 is to use the mapping to determine whether a particular bucket has been assigned to a search node 506. If the bucket has been assigned to a particular search node 506 and that search node 506 is available, then the search manager 514 can assign the bucket to the search node 506. If the bucket has not been assigned to a particular search node 506, the search manager 514 can use a hash function to identify a search node 506 for assignment. Once assigned, the search manager 514 can store the mapping for future use.

As the search manager 514 processes the results or completes processing the results, it can store the results in the query acceleration data store 222 or communicate the results to a client device 204. As described herein, results stored in the query acceleration data store 222 can be combined with other results over time. For example, if the query system 214 receives an open-ended query (e.g., no set end time), the search manager 514 can store the query results over time in the query acceleration data store 222.

Query results in the query acceleration data store 222 can be updated as additional query results are obtained. In this manner, if an open-ended query is run at time B, query results may be stored from initial time A to time B. If the same open-ended query is run at time C, then the query results from the prior open-ended query can be obtained from the query acceleration data store 222 (which gives the results from time A to time B), and the query can be run from time B to time C and combined with the prior results, rather than running the entire query from time A to time C. In this manner, the computational efficiency of ongoing search queries can be improved.

The search nodes 506 can be the primary query execution engines for the query system 214, and can be implemented as distinct computing devices, virtual machines, containers, container of a pods, or processes or threads associated with one or more containers. Accordingly, each search node 506 can include a processing device and a data store, as depicted at a high level in FIG. 5. Depending on the embodiment, the processing device and data store can be dedicated to the search node (e.g., embodiments where each search node is a distinct computing device) or can be shared with other search nodes or components of the data intake and query system 108 (e.g., embodiments where the search nodes are implemented as containers or virtual machines or where the shared data store is a networked data store).

In some embodiments, the search nodes 506 can obtain and search buckets identified by the search manager 514 that include data that satisfies at least a portion of the query, identify the set of data within the buckets that satisfies the query, perform one or more transformations on the set of data, and communicate the set of data to the search manager 514. Individually, the search node 506 can obtain the buckets assigned to it by the search manager 514 for a particular query, search the assigned buckets for a subset of the set of data, perform one or more transformation on the subset of data, and communicate partial search results to the search manager 514 for additional processing and combination with the partial results from other search nodes 506.

In some example embodiments, a cache manager 516 can communicate with the search nodes 506 to obtain or identify the location of the buckets assigned to the search nodes 506, and can be implemented as a distinct computing device, virtual machine, container, container of a pod, or a process or thread associated with a container. In some embodiments, based on the receipt of a bucket assignment, the search node 506 can provide the cache manager 516 with an identifier of the bucket that it is to search, a file associated with the bucket that it is to search, and/or a location of the bucket. In response, the cache manager 516 can determine whether the identified bucket or file is located in a local or shared data store or is to be retrieved from the common storage 216.

Figure 6A:
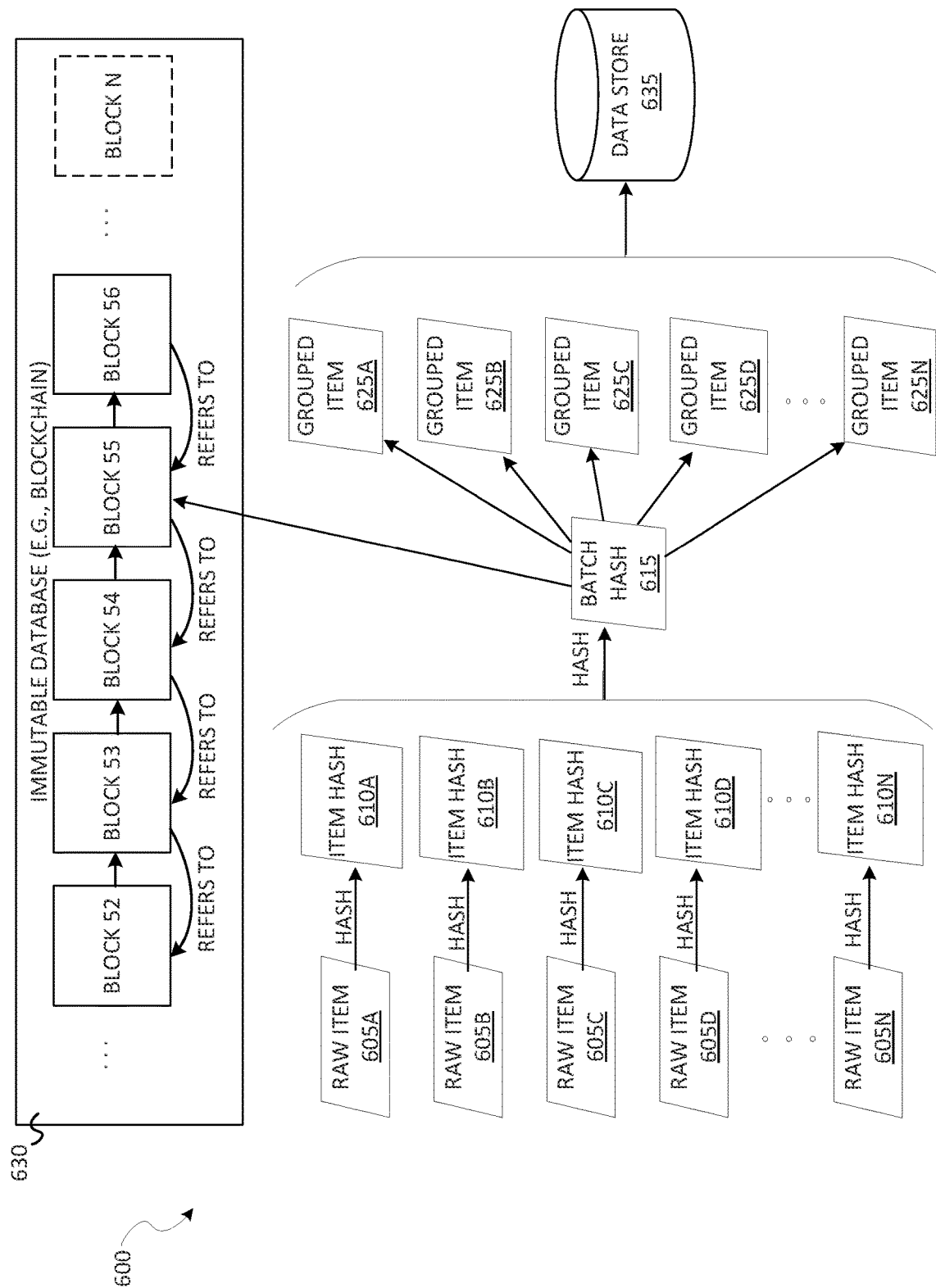
FIGS. 6A and 6B show example data architectures for performing data integrity using a machine data validation system, according to some example embodiments.
Figure 6B:
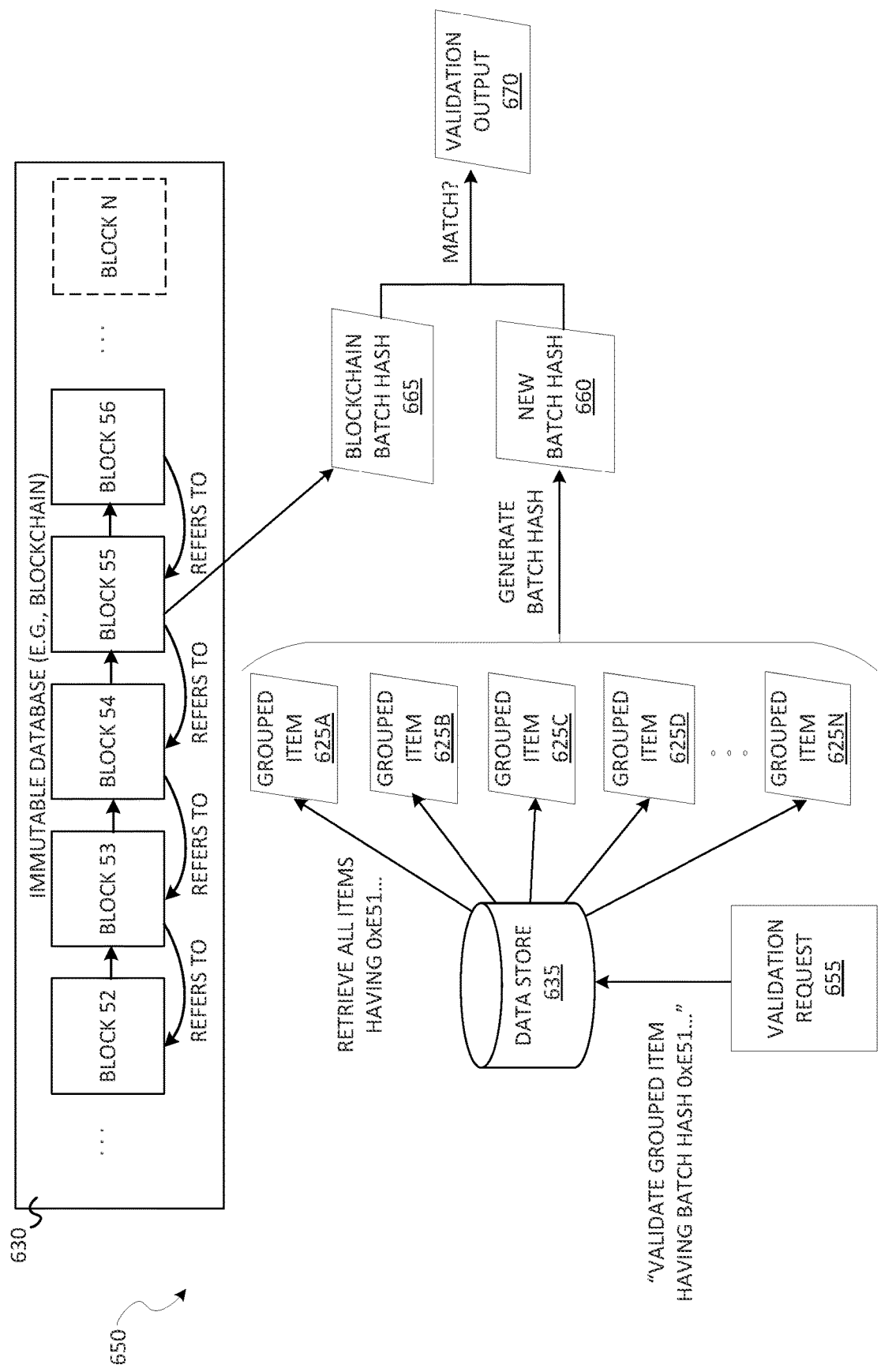

FIGS. 6A and 6B show example data architectures for performing data integrity using the machine data validation system 312, according to some example embodiments. With reference to data architecture 600 of FIG. 6A, raw items 605A-N are items of data generated from one or more machines (e.g., machine data from servers, computers, network appliances, hardware appliances). In some example embodiments, each of the raw items 605A-N are hashed by the machine data validation system 312 to generate item hashes 610A-N (e.g., using a SHA256, MD5, or another hashing scheme). The item hashes 610A-N are then sorted into a sort order (e.g., ascending, descending) and then hashed together to generate the batch hash 615. The batch hash 615 is then stored in an immutable database 630 (e.g., in a block of a blockchain). In some example embodiments, the machine data validation system 312 includes a full blockchain node that can interact with other nodes of the blockchain to perform interactions (e.g., send/receive data from the chain, modify data, store data). As illustrated, each block of the blockchain references a previous block (e.g., a hash of a previous block, block 55 refers to block 54), such that any change to previous blocks changes hash values of later blocks and such changes can be invalidated by blockchain entities (e.g., peers, miners).

In some example embodiments, the machine data validation system 312 transacts with a smart contract on the blockchain that stores the batch hash 615 for later reference (e.g., data integrity checks). The smart contract is a unit of programmable code containing conditions and parameters that can be manipulated by blockchain entities (e.g., peers, miners, clients) to record data on a blockchain.

The immutable database 630 can include, for example, a cryptocurrency based blockchain such as Bitcoin or Ethereum blockchains (e.g., permissionless chains), or a Hyperledger Fabric blockchain system (e.g., permissioned or private chains), and/or other types of immutable distributed database environments. In some example embodiments, the immutable database 630 is an external network with which the machine data validation system 312 interacts (e.g., via submission of requests to miners of the blockchain network). For instance, according to some example embodiments, the immutable database 630 is an Ethereum network in which the smart contracts are interacted with via requests to Ethereum miners, which charge a crypto unit (e.g., gas) to perform the chain processing.

As illustrated, the batch hash 615 is further added to each of the raw items 605A-605N to generate respective grouped items 625A-N. For example, the batch hash 615 is appended as a string to the end of the data included in raw item 605A to generate grouped item 625A, and so on for grouped items 625B-N. The grouped items are then stored in a data store 635 for later processing, analysis, and integrity checking, as discussed in further detail below with reference to FIG. 6B. In some example embodiments, the location of where the batch hash 615 is stored (e.g., which block, block number, network site address of the block, smart contract address of the blockchain) is recorded and stored (e.g., in data store 635) for later reference (e.g., comparison against later generated batch hashes).

In some example embodiments, each the raw items 605A-N is a bucket of events manage by the data intake and query system as a data grouping. In those example embodiments, a bucket of events is hashed to generate an item hash (e.g., raw item 605A is a bucket of events, which is hashed to generate item hash 610A, and each of the other item hashes is a hash of other buckets of events).

In some example embodiments, each of the raw items 605A-N are items to be added to a bucket (e.g., a grouping of data, a partition, a data store unit). That is for example, the bucket can capture events in a given time period (e.g., one bucket per hour) or by quantity (e.g., 1000 raw items per bucket) or by size (e.g., once 750 MB is reached, start a new bucket). In those example embodiments, all of the raw items 605A-N correspond to events in the same bucket, which are then hashed to generate batch hash 615 which functions a signature for the events in that bucket.

FIG. 6B shows an example validation data flow architecture 650 performed by the machine data validation system 312 to validate data (e.g., confirm the data is authentic, original, not modified, untampered), according to some example embodiments. In the example of FIG. 6B, the machine data validation system 312 receives a validation request 655 to validate one or more items of data. For example, the validation request 655 is a request to validate grouped item 625A, which comprises a batch hash, as discussed above with reference to FIG. 6A. In some example embodiments, the machine data validation system 312 identifies the batch hash stored with the requested item (e.g., identifies the batch hash stored in grouped item 625A) and performs a search of the data store 635 to retrieve grouped items 625A-N, each of which stores the same batch hash and thereby is grouped and retrievable in the data store 635.

The machine data validation system 312 can then arrange the retrieved grouped items into the sorted order (e.g., generating item hashes and sorting the hashes), which are then hashed together to generate new batch hash 660. The machine data validation system 312 then retrieves blockchain-stored batch hash 665 (e.g., batch hash 615 stored in block 55 in FIG. 6A). In some example embodiments, the machine data validation system 312 is a full node of the blockchain and stores an up-to-date version of the chain as the latest blocks are added (e.g., by other nodes that manage the chain). In some example embodiments, blockchain data is stored externally on a public website (e.g., as shown in FIG. 13, Etherscan.com) which can be referenced to retrieve the blockchain-stored batch hash 665 using a browser or software API (e.g., an API or browser extension of the client devices 102).

Figure 11:
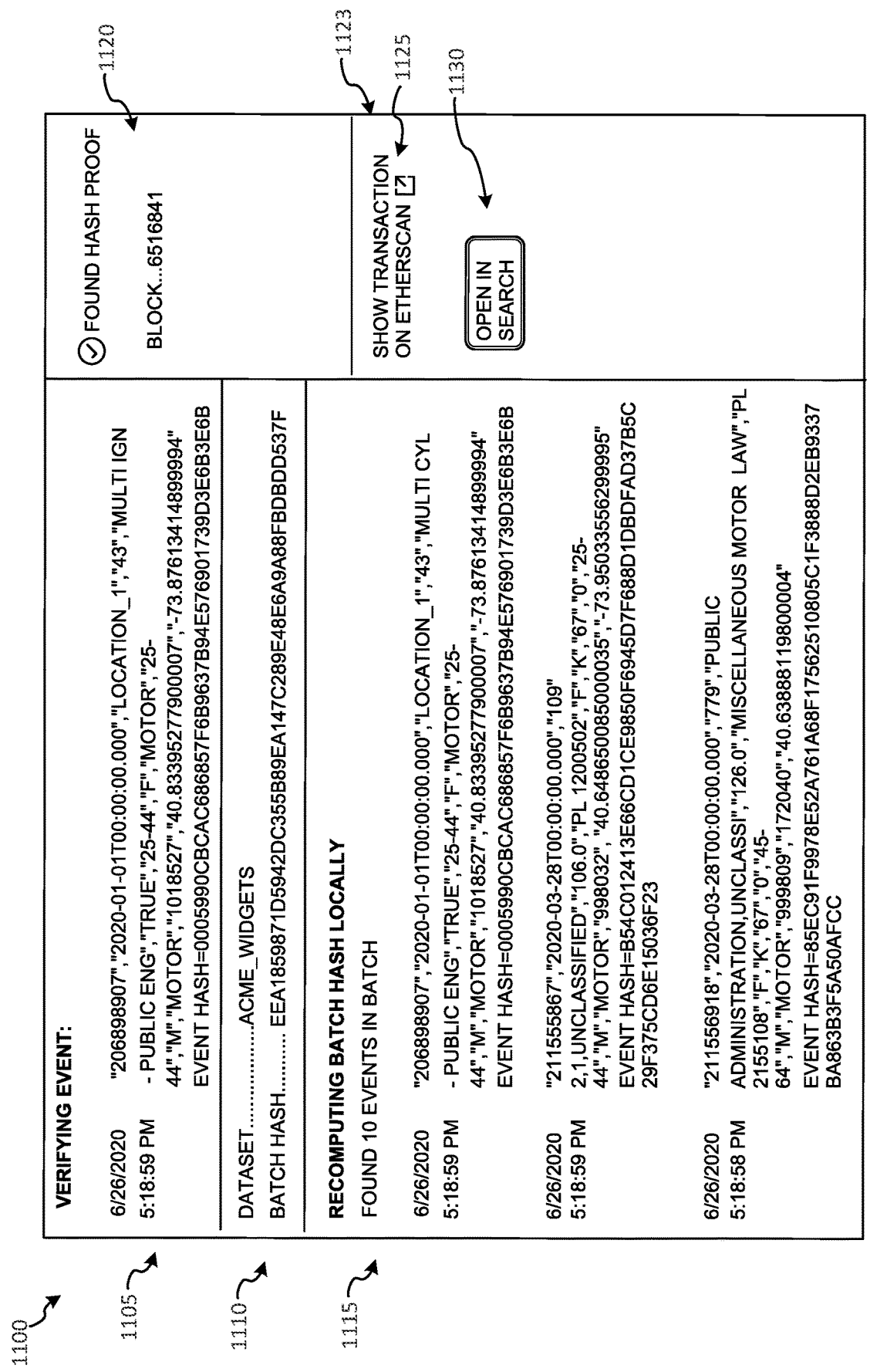
FIG. 11 shows an example verification user interface for viewing validation data, according to some example embodiments.

The machine data validation system 312 then compares the regenerated new batch hash 660 and the blockchain-stored batch hash 665 to determine if they match. If the blockchain-stored batch hash 665 matches the new batch hash 660, then the machine data validation system 312 generates a validation output 670 (e.g., user interface) as shown in FIG. 11 (validation result window 1120) and FIG. 14. Alternatively, if the blockchain-stored batch hash 665 does not match the new batch hash 660, the machine data validation system 312 then generates the validation output 670 indicating that they do not match (e.g., user interface elements indicating there is no match between the hashes, and/or further identifying items or groups of data that failed to match).

Figure 7:
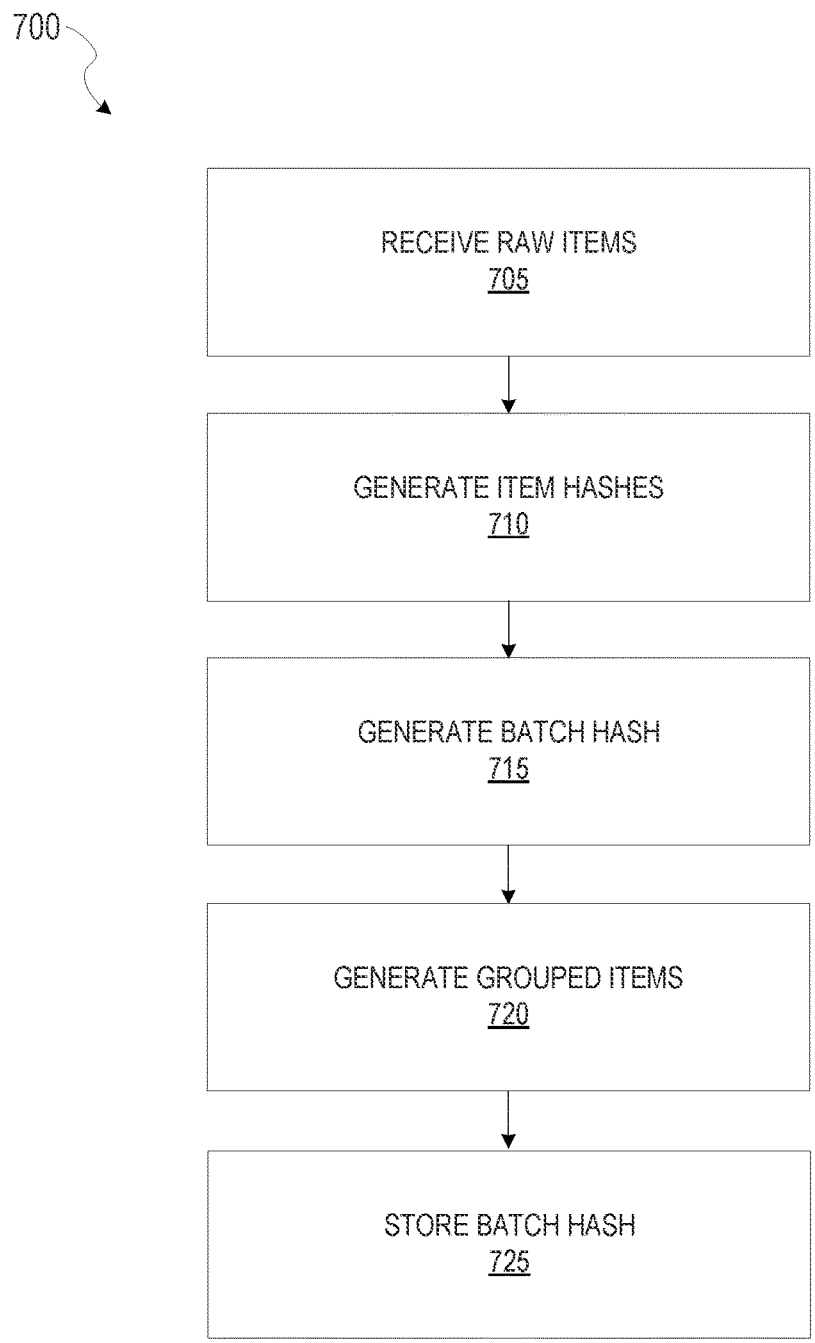
FIG. 7 shows a flow diagram of a method for generating grouped items and batch hashes to perform blockchain-based data integrity validation using the machine data validation system, according to some example embodiments.

FIG. 7 shows a flow diagram of a method 700 for generating grouped items and batch hashes to perform blockchain-based data integrity validation, according to some example embodiments. At operation 705, the machine data validation system 312 receives raw items of data. For example, at operation 705, the hash processor 314 of the intake system 210 receives machine data (e.g., raw items 605A-N) from one or more machines (e.g., client devices 102, host devices 106).

At operation 710, the machine data validation system 312 generates item hashes. For example, at operation 710, the hash processor 314 hashes each of the raw items 605A-N to generate item hashes 610A-N.

At operation 715, the machine data validation system 312 generates a batch hash from the item hashes. For example, at operation 715, the hash processor 314 sorts the item hashes 610A-N into a sorted order (e.g., ascending, descending), concatenates the sorted item hashes, and hashes them together to generate the batch hash 615.

At operation 720, the machine data validation system 312 generates grouped items by adding the batch hash to the raw items. For example, at operation 720, the hash processor 314 adds the batch hash 615 to each of the raw items 605A-N to generate grouped items 625A-N, which are stored in the data store 635 and can be retrieved as a group by searching for the batch hash 615, as discussed above with reference to FIG. 6B.

At operation 725, the machine data validation system 312 stores the batch hash. For example, at operation 725, the hash processor 314 interacts with a blockchain to store the batch hash in a block of the blockchain (e.g., block 55, FIG. 6A). In some example embodiments, the hash processor 314 interacts with one or more nodes that manage the block to transact with a smart contract stored at a smart contract address on the blockchain, where the batch hash is stored as state data of the smart contract (e.g., Ethereum state data of an Ethereum smart contract).

Figure 8:
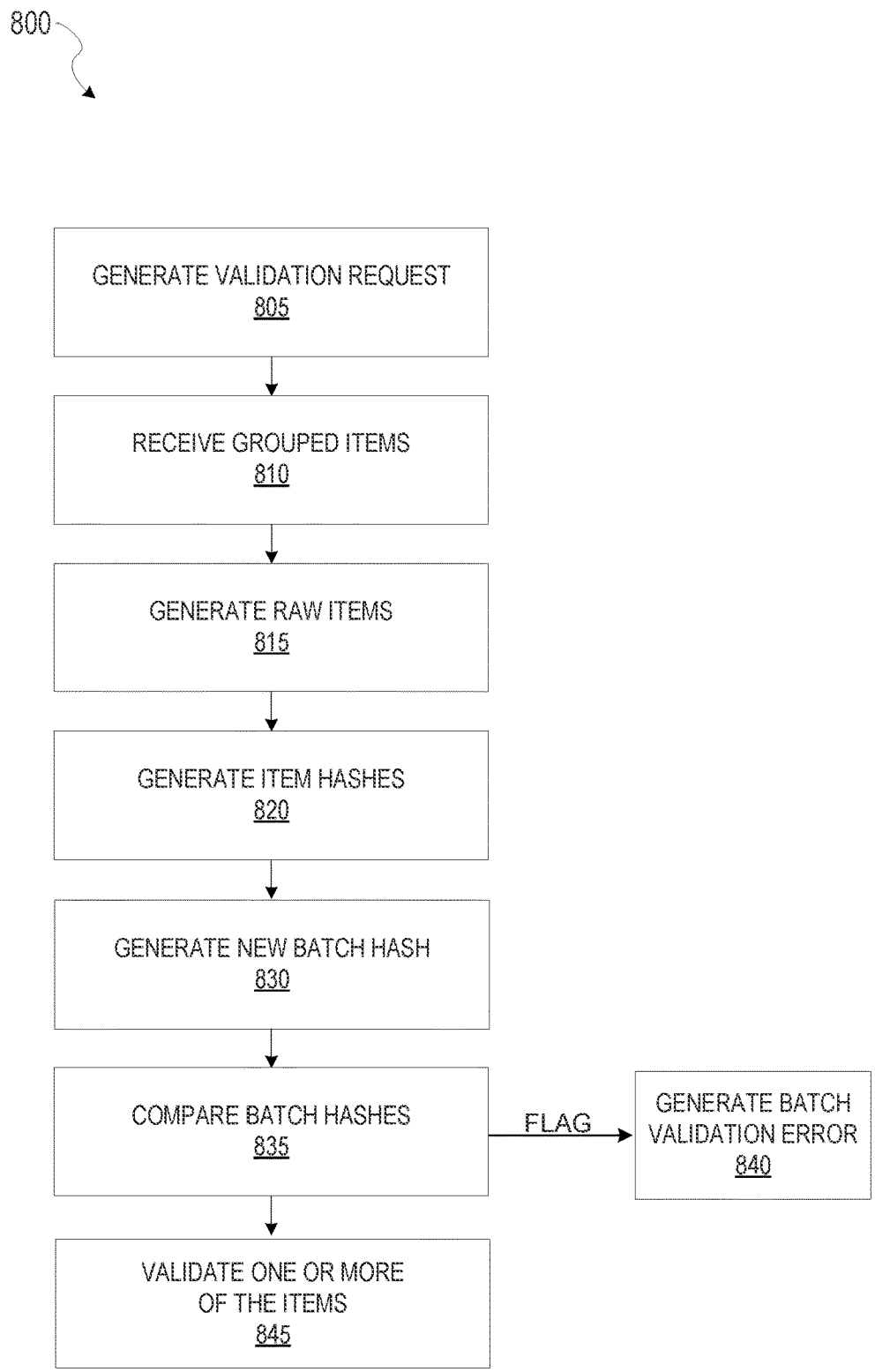
FIG. 8 shows a flow diagram of a method for validation of grouped items using the machine data validation system, according to some example embodiments.

FIG. 8 shows a flow diagram of a method 800 for validation of grouped items, according to some example embodiments. At operation 805, the machine data validation system 312 receives a validation request. For example, at operation 805, the validation processor 316 receives a validation request 655 to verify the integrity of one or more items of machine data (e.g., grouped item 625A).

At operation 810, the machine data validation system 312 accesses the grouped items that comprise the one or more items specified in the validation request. For example, at operation 810, the validation processor 316 searches and retrieves the grouped items 625A-N using the batch hash 615 that is stored in each of the grouped items 625A-N.

At operation 815, the machine data validation system 312 generates raw items by removing the batch hash from each of the raw items. For example, at operation 815, the validation processor 316 removes the batch hash 615 from each of the grouped items 625A-N to generate the raw items 605A-N.

At operation 820, the machine data validation system 312 generates item hashes from the raw items generated at operation 815. For example, at operation 820, once the batch hash has been removed to re-generate the raw items, the validation processor 316 hashes the regenerated raw items to re-generate each corresponding item hash.

At operation 830, the machine data validation system 312 generates a new batch hash by sorting the item hashes into the sorted order and then hashes them together to generate a new batch hash. For example, once the validation processor 316 has regenerated each item hash, they are sorted into the sort order and hashed together to generate a new batch hash 660, which may or may not match the original batch hash 615 depending on whether the data has been tampered with or otherwise modified during storage.

At operation 835, the machine data validation system 312 compares the new batch hash against the batch hash stored in the immutable database. If the machine data validation system 312 determines that the newly recalculated batch hash and the blockchain-stored batch hash match, then the machine data validation system 312 validates the one or more items of data of the request of operation 845. Alternatively, if the machine data validation system 312 determines that the newly recalculated batch hash and the blockchain-stored batch hash do not match, then a validation error is generated by the machine data validation system 312 at operation 840, according to some example embodiments.

Although in the examples discussed here, the operations are performed by a machine data validation system 312 running on the intake system 210 (e.g., on the server-side), in some example embodiments, one or more operations of the method 700 or method 800 can be implemented on the client side for local validation. For example, an application running on the client side (e.g., browser plugin) can generate the validation request 655 which is sent to the data intake and query system 108, which then searches for corresponding group items and transmits the grouped items to the client device, which can then hash the items locally (e.g., on the browser or local application) to ensure that the item hashes and batch hashes are accurately generated. Further, once the hashes are generated, the client application can retrieve the batch hash from the blockchain (e.g., via public website access to blockchain records, FIG. 13) and locally confirm that the client-side generated batch hash matches the blockchain-stored batch hash.

FIG. 9 shows an example user interface 900 displaying grouped items 905-920, according to some example embodiments. As illustrated, the grouped items 905-920 are time stamped events from a set of machine data (e.g., automobile data), in which each of the events comprise different parameters of data (e.g., location data, engine type, etc.) and further include the batch hash (e.g., "EEA177977 . . . ") as discussed above.

FIG. 10 shows an example user interface 1000 for generating a validation request (e.g., validation request 655, FIG. 6B), according to some example embodiments. In the example of FIG. 10, a user viewing the user interface 900 (FIG. 9) selects one of the grouped items 905-920, which causes it to expand and display a menu that comprises the verify integrity element 1005. In some example embodiments, upon selecting the verify integrity element 1005 the validation processes are initiated, as discussed above with reference to FIG. 6B and FIG. 8.

FIG. 11 show an example validation user interface 1100 for viewing validation data, according to some example embodiments. In the example of FIG. 11, the user interface 1100 is generated by the machine data validation system 312 receiving a request to validate the item 1105. As illustrated, the user interface 1100 comprises the data set 1110 ("ACME_WIDGETS") to which the item 1105 belongs, and further the batch hash stored with the item 1105. Upon identifying the batch hash, the machine data validation system 312 retrieves the corresponding items 1115 having the same batch hash, generates item hashes from each of the items, and generates a new batch hash for comparison and validation against the blockchain stored batch hash. The user interface 1100 further displays a validation result window 1120 indicating that a matching batch hash is found in block 6516841, and thus the requested item 1105 and its corresponding items 1115 are valid and not modified.

The user interface 1100 further includes a chain analysis window 1123 having a link 1125 that links to the transaction data of the block 6516841. For example, upon selecting the link 1125 the user's client device is directed to a website (e.g., Etherscan website) showing the transaction data, as shown in the browser user interface 1300 displayed in FIG. 13.

Figure 12:
FIG. 12 shows an example user interface for displaying locally stored blockchain data for look up of batch hashes, according to some example embodiments.

Returning to FIG. 11, the chain analysis window 1123 includes a further link 1130 which can open the block chain data in the query system 214. For example, the query system 214 can store an updated version of the blockchain. In response to the user selecting the link 1130, the query system 214 searches and identifies the block having the batch hash for comparison, and then displays the user interface 1200, in FIG. 12, with event data for the validated event, which includes the batch hash 1205.

FIG. 14 shows an example user interface 1400 for validation of an entire data set using the machine data validation system 312, according to some example embodiments. In the illustrated example, there are ten batch hashes 1405, each of which is generated from ten event items (e.g., raw items 605A-N). In some example embodiments, the machine data validation system 312 performs method 800 for each of the batch hashes and outputs a status indicator indicating that the data is valid (e.g., a checkmark) or invalid (e.g., an exclamation mark).

Figure 15:
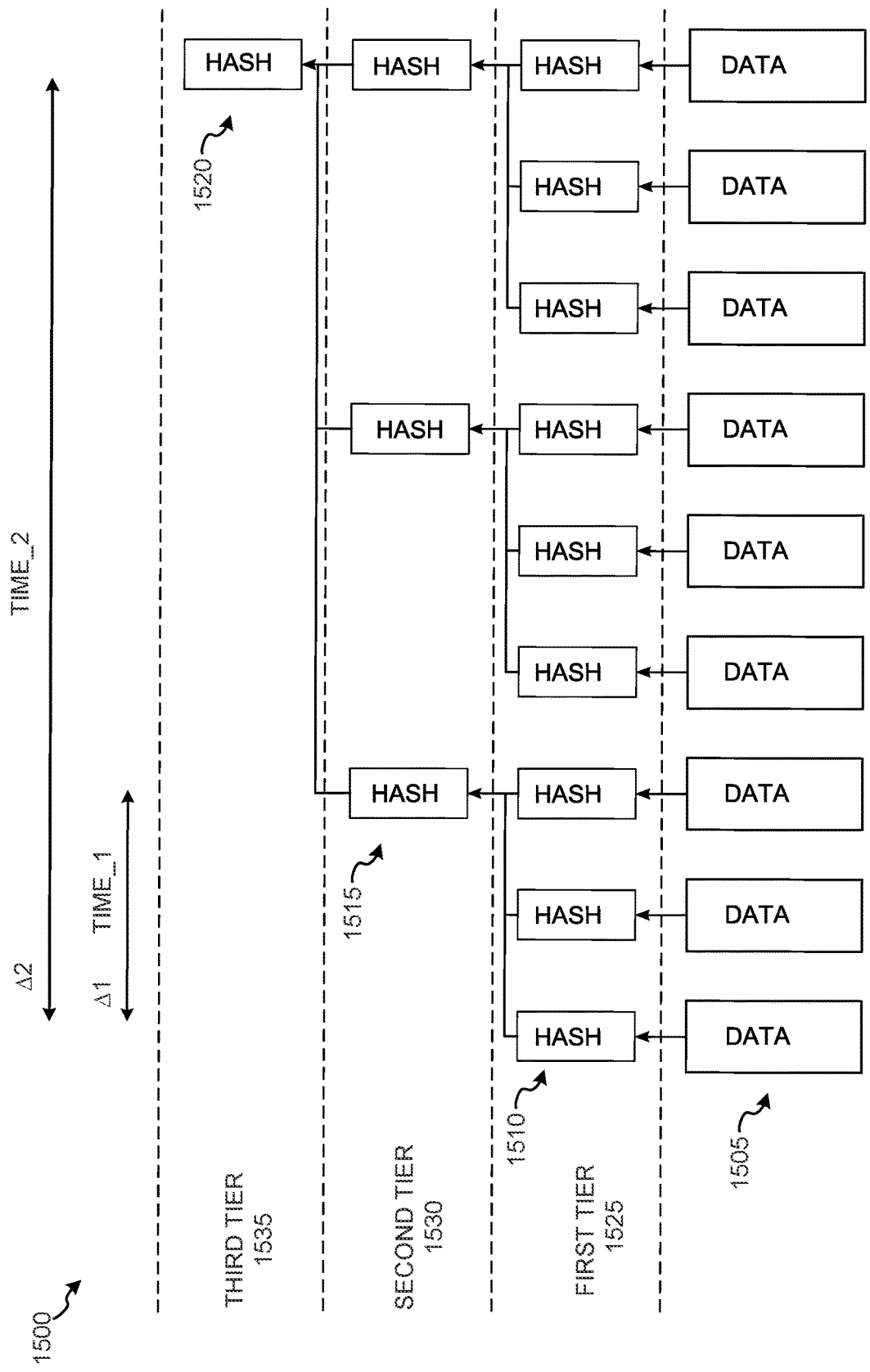
FIG. 15 shows an example staggered blockchain data architecture for efficient storing and retrieval of hash data by the system, according to some example embodiments.

FIG. 15 shows an example staggered blockchain data architecture 1500 for efficient storing and retrieval of hash data by the machine data validation system 312, according to some example embodiments. At a high level, in the approach of FIG. 15, hashes and batch hashes are stored in a lightweight, relatively less immutable but inexpensive to access blockchain (e.g., permissioned chain, a permissionless chain with low crypto-costs per transaction) while groups of batch hashes are combined to generate combined batch hashes, which are stored in a more robust, highly immutable but more expensive blockchain (e.g., Bitcoin, Ethereum). In this way, the costs of hash management via blockchain interactions is made more efficient while ensuring that the data is secure and trustworthy (e.g., via storage in the highly immutable chain). In particular, and in accordance with some example embodiments, each of the machine data items 1505 (e.g., raw items 605A-N) is hashed to generate the respective hashes 1510 (e.g., item hashes 610A-N) that are stored in a first tier of immutable storage 1525, which is configured as a low-cost and fast data store that has weak immutability (e.g., object storage database such as Amazon S3, a relational database).

Then after a short period "TIME_1," a group of the hashes 1510 are sorted and hashed together to generate the batch hashes 1515, as discussed above with reference to FIG. 6A. The batch hashes 1515 are then stored in an intermediate second tier of immutable storage 1530 that has good immutability and a relatively low cost per interaction (e.g., private chain, permissioned blockchain, Hyperledger, EOS).

Further, after a longer period "TIME_2", the batch hashes 1515 are then grouped together, sorted, and hashed together to generate a combined batch hash 1520, which is then stored in a third tier of immutable storage 1535 that has high immutability but generally higher transactional and storage costs (e.g., Bitcoin, Ethereum, permissionless chains). In this way, different sets of data can be validated at a more granular level without requiring constant transactions with an expensive-to-access chain. For example, the machine data validation system 312 can receive a request to perform an intermediate strength data validation using the batch hashes 1515 (e.g., from which all the underlying hashes can be readily generated locally very quickly with little to no cost), while still allowing periodic interactions with a trustworthy secure chain via the combined batch hashes 1520 that are stored in the third tier of immutable storage 1535.

Although in FIG. 15 the times to generate the batch hashes are discussed as lengths of time (e.g., time_1 is every 5 minutes and time_2 is every hour or day), in some example embodiments, the time corresponds to a set number of items to be included in a given set to generate a batch hash. For example, as illustrated in FIG. 15, TIME_1 can correspond to the time it takes to generate three of the machine data items 1505: when three items are generated, they are hashed, sorted, and then the hashes are hashed together to generate one of the batch hashes 1515. Similarly, the TIME_2 can correspond to a pre-specified quantity. For example, as illustrated in FIG. 15, when three batch hashes 1515 have been generated, they are sorted and hashed together to generate the combined batch hash 1520.

Alternatively, and in accordance with some example embodiments, the time span or quantity limit to generate batch hashes and/or combined batch hashes can be random or arbitrary to further increase the data integrity of the system. For example, a random trigger event can occur at different times (e.g., two minutes, then five minutes, then three minutes at random intervals); upon the occurrence of the trigger, the machine data items in the given interval are collected and used to generate a batch hash. In this way, the structure of the hashes is unknown to a potential malicious attacker (e.g., that is, the attacker will not know if a given batch hash was created by 10 machine items or 17 machine items).

Figure 16:
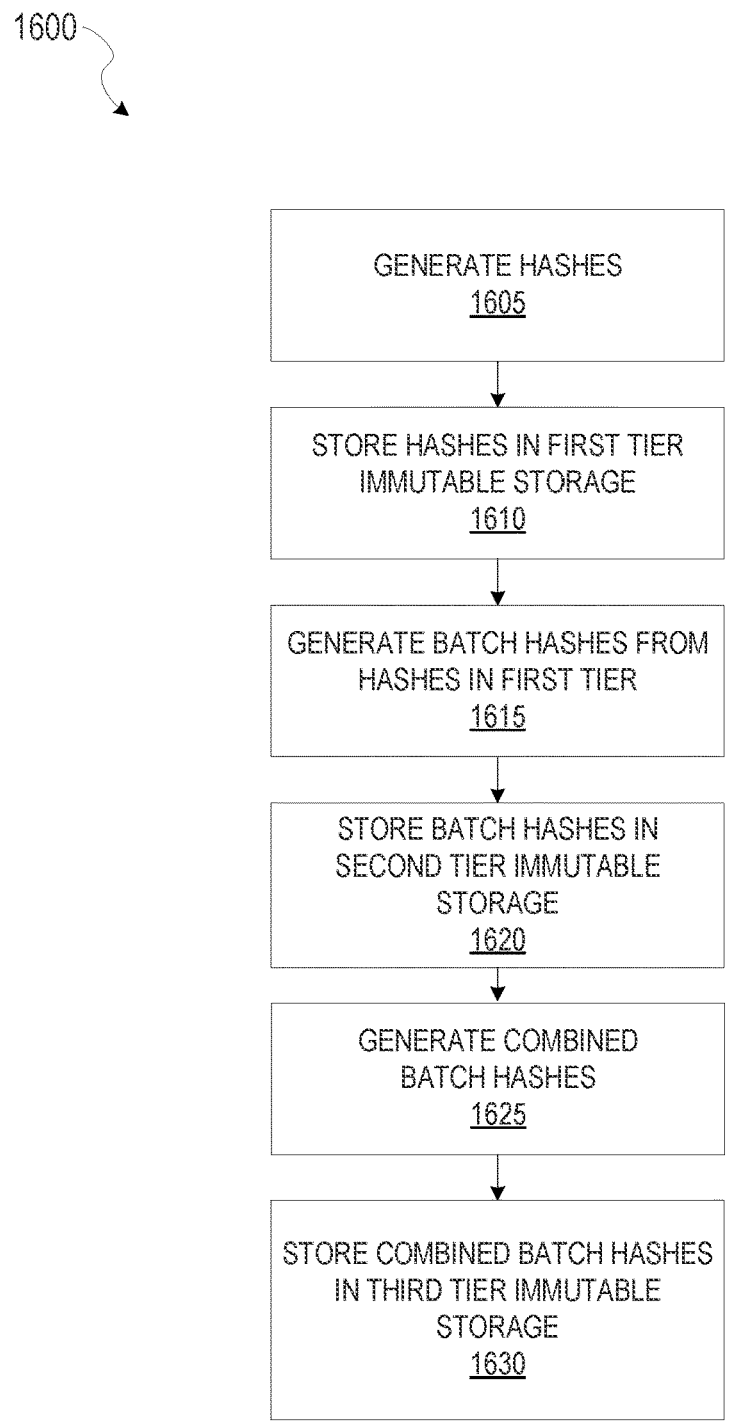
FIG. 16 shows an example flow diagram of a method for performing efficient data validation using different blockchains, according to some example embodiments.

FIG. 16 shows an example flow diagram of a method 1600 for performing efficient data validation using different blockchains, according to some example embodiments. At operation 1605, the machine data validation system 312 generates the hashes 1510 from the machine data items 1505. At operation 1610, the machine data validation system 312 stores the hashes 1510 in the first tier of immutable storage 1525, such as a data store system that has weak immutability but low transaction and storage costs and fast performance (e.g., Amazon S3, local memory).

At operation 1615, the machine data validation system 312 generates the batch hashes 1515 from the hashes 1510 stored in the first tier of immutable storage 1525. At operation 1620, the machine data validation system 312 stores the batch hashes 1515 in a second tier of immutable storage 1530, such as a blockchain with intermediate immutability and reasonable transaction costs (e.g., a permissioned blockchain, private blockchain, Substrate, EOS, Hyperledger).

At operation 1625, the machine data validation system 312 generates the combined batch hash 1520 from the batch hashes 1515. At operation 1630, the machine data validation system 312 stores the combined batch hash 1520 in the third tier of immutable storage 1535, such as a blockchain with strong immutability but higher transaction and storage costs (e.g., Bitcoin, Ethereum).

Figure 17:
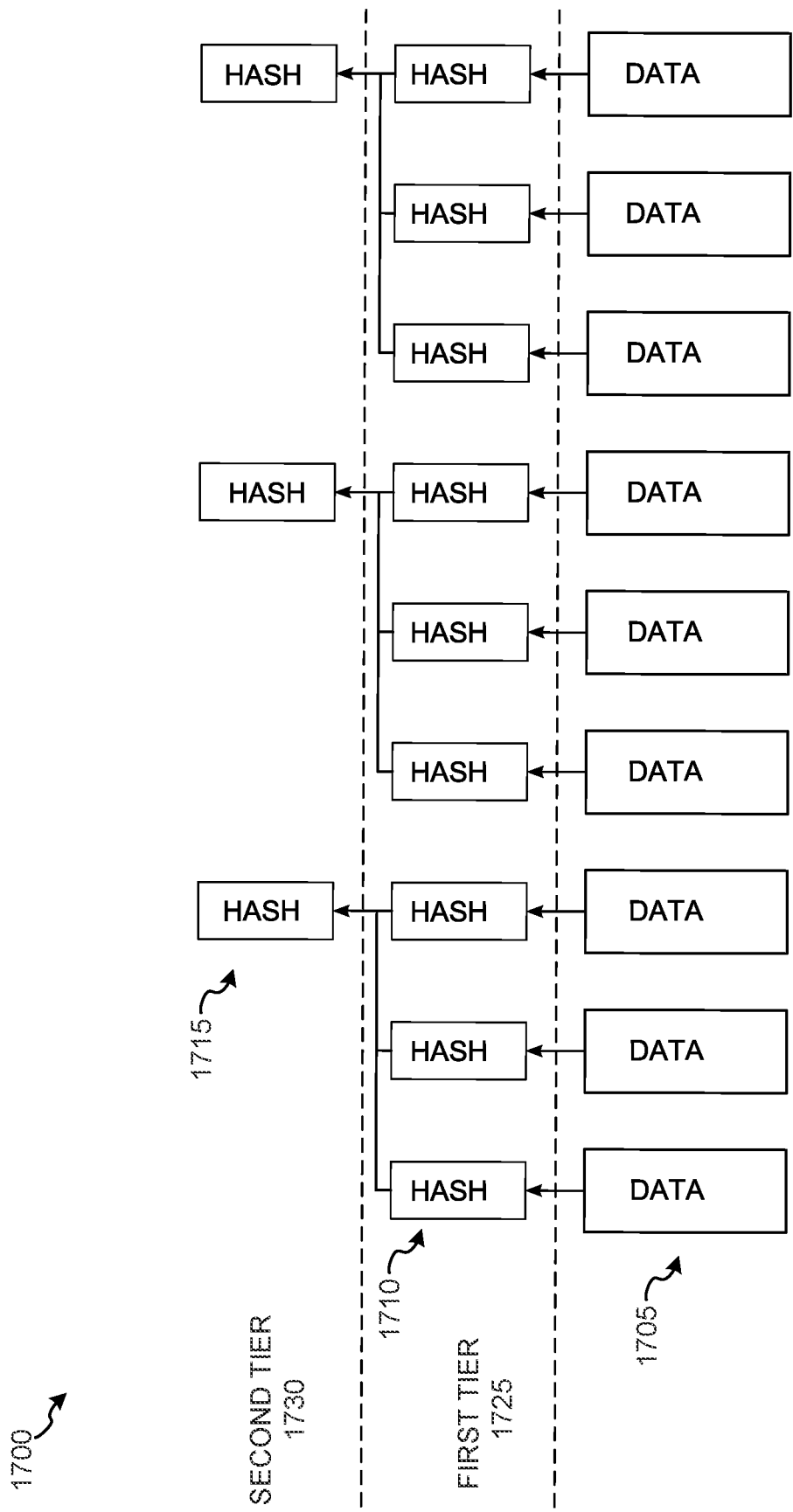
FIG. 17 shows a tiered blockchain architecture, according to some example embodiments.

FIG. 17 shows a tiered blockchain architecture 1700, in accordance with some example embodiments. In the example embodiment of FIG. 17, the tiered blockchain architecture 1700 comprises a first blockchain tier 1725 of a first blockchain system that stores a plurality of hashes 1710 generates from a plurality of data items 1705, and further comprises a second blockchain tier 1730 that stores a plurality of hashes 1715 generates by hashing sets of hashes from the first blockchain tier 1725. In some example embodiments, the first blockchain system of the first blockchain tier 1725 is a specially configured highspeed blockchain system that can store a large amount of data items. For example, the first blockchain system of the first blockchain tier 1725 can be implemented as a custom blockchain system (e.g., Substrate, Hyperledger) in which the consensus mechanism is configured to be higher speed than the consensus mechanism of the second blockchain system of the second blockchain tier 1730. For example, the second blockchain system uses a Proof-of-Work consensus mechanism (e.g., Bitcoin, Ethereum) and the first blockchain system uses a faster Proof-of-Stake mechanism in which nodes provide a stake (e.g., crypto-coin deposit) to be permissioned on the blockchain. In some example embodiments, the first blockchain system of the first blockchain tier 1725 is further configured for speed by shortening the block generation time such that it is faster than the block generation time of the second blockchain system of the second blockchain tier 1730 (e.g., the second blockchain tier 1730 comprises Bitcoin or Ethereum and uses a block generation time of 10 minutes, and the first blockchain tier 1725 is Substrate blockchain with a block generation time of 2 minutes). Further, in accordance with some example embodiments, the operational code surface area of the first blockchain system of the first blockchain tier 1725 is minimized to increase the security of the first blockchain tier 1725. For example, the second blockchain system of the second blockchain tier 1730 can include a full library of instructions (e.g., Bitcoin's non-Turing complete Script, Ethereum's Turing complete Solidity) and larger attackable surface area, and the first blockchain system of the first blockchain tier 1725 includes a limited set of instructions that the nodes can process to lower the risk of malicious attacks (e.g., each node of first blockchain system can run only two instructions (opcodes): submit a data integrity request, and verify the hashes 1710). In this way, the first blockchain system of the first blockchain tier 1725 is faster and has acceptable data security and immutability, while the second blockchain system of the second blockchain tier 1730 is highly secure and used to immutably secure a plurality of hashes 1715 in a periodic manner.

The data items 1705 can include machine data items that are stored in buckets (e.g., data groupings) as discussed above. As discussed above, an index comprises compressed raw data and associated index files, which are distributed into buckets. Further, the data items 1705 can comprise intermediate data that is not stored in the buckets, such as payload data used to generate the machine data items, streaming data that comprises versions of the data at different points in the stream (e.g., compressed, decompressed, filtered), and configuration data of the network architecture (e.g., firewall settings, network addresses of nodes).

In some example embodiments, one of the plurality of hashes 1715 is generated each time a bucket is full, and while the bucket is not full (e.g., machine data is being generated and stored in the bucket), all intermediate data is hashed and stored in the first blockchain tier 1725. In some example embodiments, upon the bucket becoming full, the bucket is hashed to generate a batch hash which is stored in the first blockchain tier 1725, and then further concatenated with other intermediate data (generated while the bucket was being filled) to generate one of the plurality of hashes 1715, which is then stored in the high security and more immutable second blockchain tier 1730.

Figure 18:
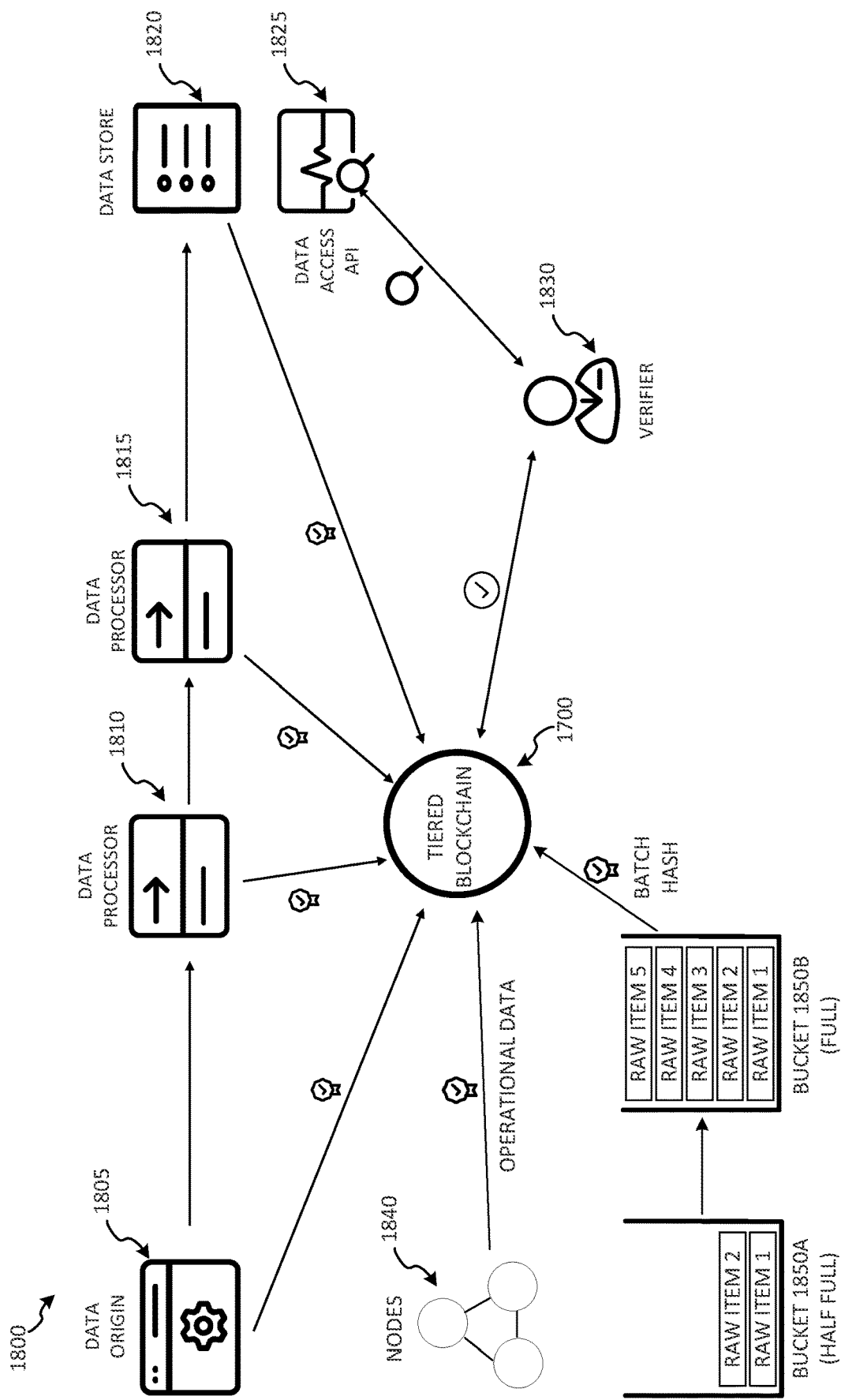
FIG. 18 shows an example architecture for implementing tiered blockchain data integrity, in accordance with some example embodiments.

FIG. 18 shows an example architecture 1800 for implementing tiered blockchain data integrity, in accordance with some example embodiments. In FIG. 18, streaming data is provided at the data origin 1805 (e.g., payload data, video data, image data, files), processed in the stream at data processor 1810 (e.g., filtering), further processed in the stream at data processor 1815 (e.g., compression, decompression, and stored in the data store 1820 (e.g., data intake and query system 108). In some example embodiments, as discussed above, a hash is generated at each point in the data stream and stored in the fast blockchain system of the first blockchain tier 1725, while the current bucket 1850A is half full and still collecting data. Further, while the bucket 1850A is being filled, further intermediate data of the nodes 1840 that generate the machine data is hashed and stored in the first blockchain tier 1725 of the tiered blockchain architecture 1700. For example, the nodes 1840 are compute instances (e.g., VMs) that perform processing for the data intake and query system 108, and the network settings of the nodes (e.g., firewall settings, configuration files) are hashed and stored in the first blockchain tier 1725. In some example embodiments, once the bucket 1850B is filled the bucket is then hashed and the hash is combined with the intermediate data hashes and stored in the second blockchain tier 1730 of the tiered blockchain architecture 1700. For example, a batch hash is generated for the bucket items as discussed above with reference to FIG. 6A, and the batch hash is then concatenated with the intermediate data item hashes in stored in the first blockchain tier 1725 and the resulting concatenation is hashed and stored in the second blockchain tier 1730. An end-user verifier 1830 can then access a data access API 1825 to request a data integrity check on the data stored in the tiered blockchain architecture 1700. As discussed above, the end-user can download all the data an recompute all the hashes on the client side to ensure that the data has untampered.

Figure 19:
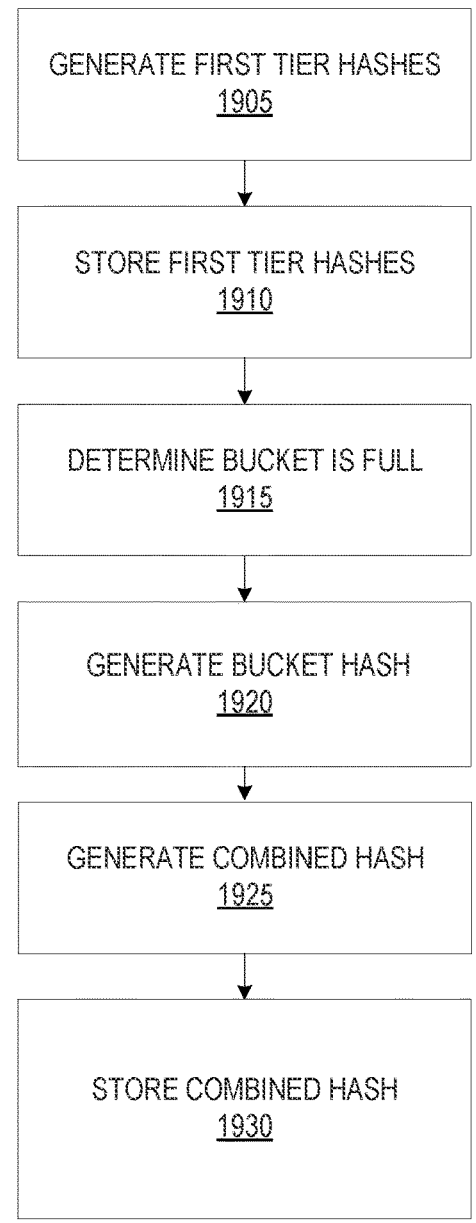
FIG. 19 shows a flow diagram of a method for implementing data integrity on a tiered blockchain architecture, in accordance with some example embodiments.

FIG. 19 shows a flow diagram of a method 1900 for implementing data integrity on a tiered blockchain architecture, in accordance with some example embodiments. At operation 1905, the machine data validation system 312 generates hashes for storage in a lightweight fast blockchain of the first blockchain tier 1725. For example, at operation 1905, the machine data validation system 312 hashes streaming data at different points, payload data, configuration and settings data.

At operation 1910, the machine data validation system 312 stores the hashes in the lightweight blockchain. In some example embodiments, while operations 1905 and 1910 are performed multiple times for each item of intermediate data, a current bucket is being filled with machine data items.

At operation 1915, the machine data validation system 312 determines that the current bucket is full. At operation 1920, in response to the current bucket filling, a hash is generated for the bucket. In some example embodiments, the hash generated for the filled bucket is a batch hash in which the bucket's contents are each hashed and combined, as discussed above with reference to FIG. 6A. In some example embodiments, each raw item in the bucket is hashed and stored in the first blockchain tier 1725 as one of the hashes, along with individual hashes of the intermediate data in the plurality of hashes 1710. Further, once a bucket is full and a batch hash is generated, the raw item hashes (which have been already generated for storage in the first tier) are then used to generate a batch hash (e.g., batch hash 615), which are then combined (e.g., concatenated) and hashed to generate a combined hash for storage in the second blockchain tier 1730.

At operation 1925, the machine data validation system 312 generates a combined hash (e.g., one of the plurality of hashes 1715) by hashing the bucket hash with the intermediate data hashes, which is then stored in a secure blockchain system of the second blockchain tier 1730 (e.g., permissionless blockchain with high immutability, Bitcoin, Ethereum) at operation 1930.

Figure 20:
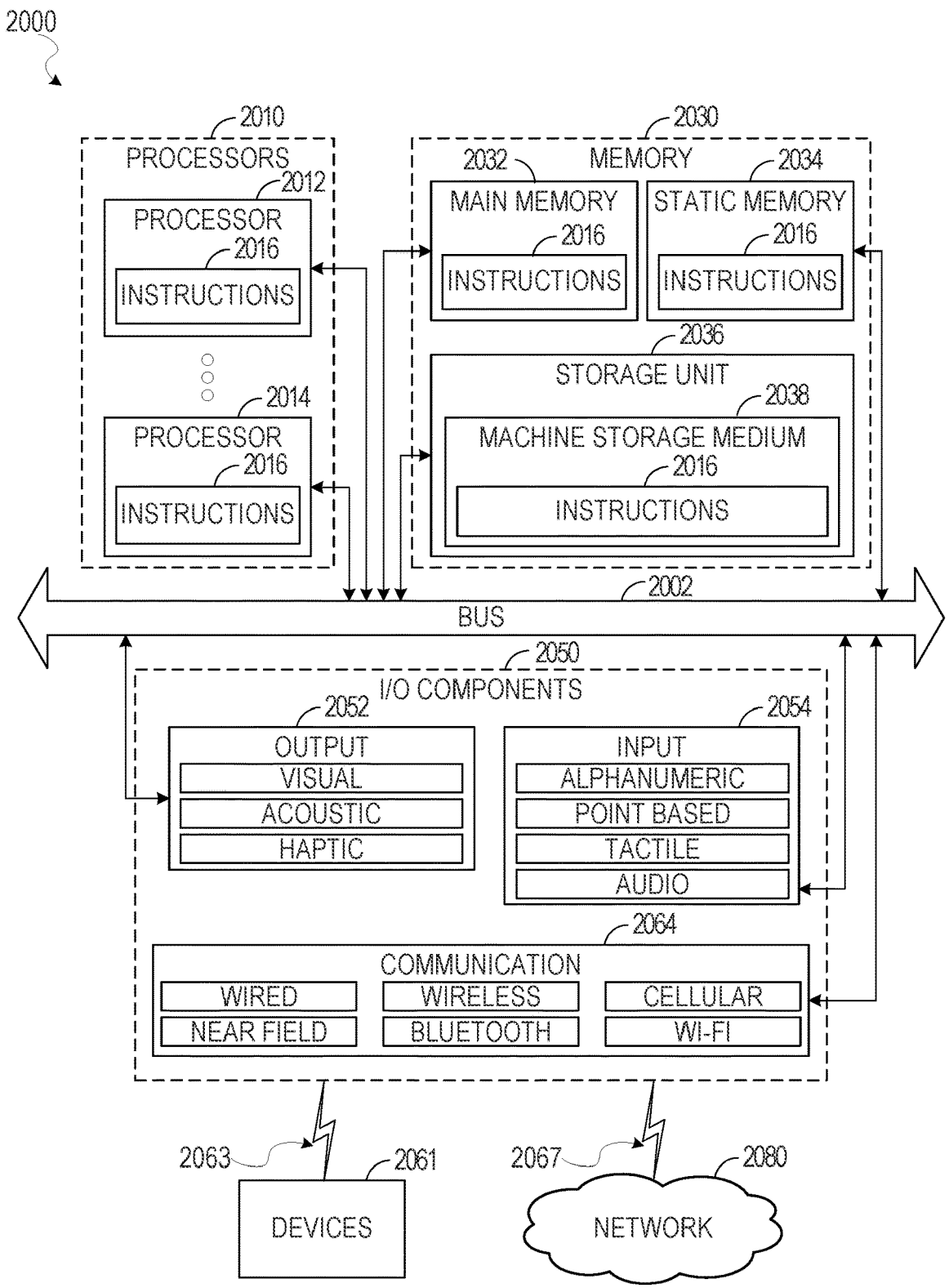
FIG. 20 illustrates a diagrammatic representation of a machine in the form of a computer system within which a set of instructions may be executed for causing the machine to perform any one or more of the methodologies discussed herein, in accordance with some embodiments of the present disclosure.

FIG. 20 illustrates a diagrammatic representation of a machine 2000 in the form of a computer system within which a set of instructions may be executed for causing the machine 2000 to perform any one or more of the methodologies discussed herein, according to an example embodiment. Specifically, FIG. 20 shows a diagrammatic representation of the machine 2000 in the example form of a computer system, within which instructions 2016 (e.g., software, a program, an application, an applet, an app, or other executable code) for causing the machine 2000 to perform any one or more of the methodologies discussed herein may be executed. For example, the instructions 2016 may cause the machine 2000 to execute any one or more operations of any of the dataflows and/or methods discussed above. In this way, the instructions 2016 transform a general, non-programmed machine into a particular machine 2000 that is specially configured to carry out any one of the described and illustrated functions in the manner described herein.

In alternative embodiments, the machine 2000 operates as a standalone device or may be coupled (e.g., networked) to other machines. In a networked deployment, the machine 2000 may operate in the capacity of a server machine or a client machine in a server-client network environment, or as a peer machine in a peer-to-peer (or distributed) network environment. The machine 2000 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 2016, sequentially or otherwise, that specify actions to be taken by the machine 2000. Further, while only a single machine 2000 is illustrated, the term "machine" shall also be taken to include a collection of machines 2000 that individually or jointly execute the instructions 2016 to perform any one or more of the methodologies discussed herein.

The machine 2000 includes processors 2010, memory 2030, and I/O components 2050 configured to communicate with each other such as via a bus 2002. In an example embodiment, the processors 2010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 2012 and a processor 2014 that may execute the instructions 2016. The term "processor" is intended to include multi-core processors 2010 that may comprise two or more independent processors (sometimes referred to as "cores") that may execute instructions 2016 contemporaneously. Although FIG. 20 shows multiple processors 2010, the machine 2000 may include a single processor with a single core, a single processor with multiple cores (e.g., a multi-core processor), multiple processors with a single core, multiple processors with multiple cores, or any combination thereof.

The memory 2030 may include a main memory 2032, a static memory 2034, and a storage unit 2036 comprising a machine storage medium 2038, all accessible to the processors 2010 such as via the bus 2002. The main memory 2032, the static memory 2034, and the storage unit 2036 store the instructions 2016 embodying any one or more of the methodologies or functions described herein. The instructions 2016 may also reside, completely or partially, within the main memory 2032, within the static memory 2034, within the storage unit 2036, within at least one of the processors 2010 (e.g., within the processor's cache memory), or any suitable combination thereof, during execution thereof by the machine 2000.

The I/O components 2050 include components to receive input, provide output, produce output, transmit information, exchange information, capture measurements, and so on. The specific I/O components 2050 that are included in a particular machine 2000 will depend on the type of machine. For example, portable machines such as mobile phones will likely include a touch input device or other such input mechanisms, while a headless server machine will likely not include such a touch input device. It will be appreciated that the I/O components 2050 may include many other components that are not shown in FIG. 20. The I/O components 2050 are grouped according to functionality merely for simplifying the following discussion and the grouping is in no way limiting. In various example embodiments, the I/O components 2050 may include output components 2052 and input components 2054. The output components 2052 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 2054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 2050 may include communication components 2064 operable to couple the machine 2000 to a network 2080 or devices 2061 via a coupling 2067 and a coupling 2063, respectively. For example, the communication components 2064 may include a network interface component or another suitable device to interface with the network. In further examples, the communication components 2064 may include wired communication components, wireless communication components, cellular communication components, and other communication components to provide communication via other modalities. The devices 2061 may be another machine or any of a wide variety of peripheral devices (e.g., a peripheral device coupled via a universal serial bus (USB)). For example, as noted above, the machine 2000 may correspond to any one of the client devices 102, host devices 106, network devices that implement networks 104 (e.g., routers), and the data intake and query system 108, in accordance with some example embodiments.

The various memories (e.g., 2030, 2032, 2034, and/or memory of the processor(s) 2010 and/or the storage unit 2036) may store one or more sets of instructions 2016 and data structures (e.g., software) embodying or utilized by any one or more of the methodologies or functions described herein. These instructions 2016, when executed by the processor(s) 2010, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 2080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 2080 or a portion of the network 2080 may include a wireless or cellular network, and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 2016 may be transmitted or received over the network 2080 using a transmission medium via a network interface device (e.g., a network interface component included in the communication components 2064) and utilizing any one of a number of well-known transfer protocols (e.g., HTTP). Similarly, the instructions 2016 may be transmitted or received using a transmission medium via a coupling (e.g., a peer-to-peer coupling) to the devices 2061. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 2016 for execution by the machine 2000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods 700, 800, and 1600 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The following are example embodiments:

Example 1. A method comprising: receiving, by one or more servers of a network platform, machine data items from one or more networked devices, the one or more networked devices generating intermediate data in generating the machine data items; grouping the machine data items into time-based data groupings, the time-based data groupings comprising a full data grouping that includes a first set of the machine data items and a first intermediate dataset of the intermediate data, the time-based data groupings further comprising a current data grouping in which a second set of the machine data items are stored; generating a first data grouping batch hash in a first blockchain system, the first data grouping batch hash generated by hashing the first set of machine data items with hashes of the first intermediate dataset, the hashes of the first intermediate dataset being further stored in a second, blockchain system that generates blocks faster than the first blockchain system; generating hashes of a second intermediate dataset of the intermediate data in the second blockchain system, the hashes of a second intermediate dataset being stored in the second blockchain system while the current data grouping is not full and new items of the second set of the machine data items are being stored in the current data grouping; and generating a second data grouping batch hash in the first blockchain system in response to the current data grouping being full, the second data grouping batch hash generated by hashing the second set of machine data items with the hashes of the second intermediate dataset.

Example 2. The method of any of example 1, wherein the first blockchain system is a public blockchain.

Example 3. The method of any of examples 1 or 2, wherein the second blockchain system is a permissioned blockchain system managed by permissioned nodes.

Example 4. The method of any of examples 1-3, wherein the second blockchain system comprises an operational setting to generate blocks faster than the first blockchain system.

Example 5. The method of any of examples 1-4, wherein the operational setting is a block generation time.

Example 6. The method of any of examples 1-5, wherein the operational setting is a consensus scheme.

Example 7. The method of any of examples 1-6, wherein the first blockchain system uses a proof of work (PoW) consensus scheme and the second blockchain system uses a non-PoW based consensus scheme.

Example 8. The method of any of examples 1-7, wherein the machine data items are generated in a data stream of the network platform, and the intermediate data comprises versions of the machine data items at different points in the data stream.

Example 9. The method of any of examples 1-8, wherein the intermediate data comprises a compressed version of the machine data items.

Example 10. The method of any of examples 1-10, wherein the intermediate data comprises an uncompressed version of the machine data items.

Example 11. The method of any of examples 1-8, wherein the intermediate data comprises a filtered version of the machine data items.

Example 12. The method of any of examples 1-11, wherein the intermediate data comprises configuration settings used by the networked devices to generate the machine data items.

Example 13. The method of any of examples 1-12, wherein the configuration settings are network configuration settings of the networked devices.

Example 14. The method of any of examples 1-13, wherein the machine data items comprise metadata describing payload data that is generated by the networked devices.

Example 15. The method of any of examples 1-14, wherein the payload data comprises image data and the metadata describes the image data.

Example 16. The method of any of examples 1-15, wherein the intermediate data comprises the payload data, the payload data being hashed and recorded in the second blockchain system.

17. A system comprising: one or more hardware processors; and a storage device storing instructions that configure the one or more hardware processors to perform any of the methods of examples 1-16.

20. A non-transitory machine-storage medium storing instructions that when executed by one or more hardware processors of a machine, cause the machine to perform any of the methods of examples 1-16.

What is claimed is:

1. A method comprising:
receiving, by one or more servers of a network platform, machine data items from one or more networked devices, the one or more networked devices generating intermediate data in generating the machine data items;
grouping the machine data items into time-based data groupings the time-based data groupings comprising a full data grouping that includes a first set of the machine data items and a first intermediate dataset of the intermediate data, the time-based data groupings further comprising a current data grouping in which a second set of the machine data items are stored;
generating a first data grouping batch hash in a first blockchain system, the first data grouping batch hash generated by combining a hash of the first set of machine data items with hashes of the first intermediate dataset, the hashes of the first intermediate dataset being further stored in a second blockchain system that generates blocks faster than the first blockchain system;
generating hashes of a second intermediate dataset of the intermediate data in the second blockchain system, the hashes of a second intermediate dataset being stored in the second blockchain system while the current data grouping is not full and new items of the second set of the machine data items are being stored in the current data grouping; and
generating a second data grouping batch hash in the first blockchain system in response to the current data grouping being full, the second data grouping batch hash generated by combining a hash of the second set of machine data items with the hashes of the second intermediate dataset.

2. The method of claim 1, wherein the first blockchain system is a public blockchain.

3. The method of claim 2, wherein the second blockchain system is a permissioned blockchain system managed by permissioned nodes.

4. The method of claim 1, wherein the second blockchain system comprises an operational setting to generate blocks faster than the first blockchain system.

5. The method of claim 4, wherein the operational setting is a block generation time.

6. The method of claim 4, wherein the operational setting is a consensus scheme.

7. The method of claim 6, wherein the first blockchain system uses a proof of work (PoW) consensus scheme and the second blockchain system uses a non-PoW based consensus scheme.

8. The method of claim 1, wherein the machine data items are generated in a data stream of the network platform, and the intermediate data comprises versions of the machine data items at different points in the data stream.

9. The method of claim 8, wherein the intermediate data comprises a compressed version of the machine data items.

10. The method of claim 8, wherein the intermediate data comprises an uncompressed version of the machine data items.

11. The method of claim 8, wherein the intermediate data comprises a filtered version of the machine data items.

12. The method of claim 1, wherein the intermediate data comprises configuration settings used by the networked devices to generate the machine data items.

13. The method of claim 12, wherein the configuration settings are network configuration settings of the networked devices.

14. The method of claim 1, wherein the machine data items comprise metadata describing payload data that is generated by the networked devices.

15. The method of claim 14, wherein the payload data comprises image data and the metadata describes the image data.

16. The method of claim 14, wherein the intermediate data comprises the payload data, the payload data being hashed and recorded in the second blockchain system.

17. A system comprising:
one or more hardware processors; and
a storage device storing instructions that configure the one or more hardware processors to perform operations comprising:
receiving, by one or more servers of a network platform, machine data items from one or more networked devices, the one or more networked devices generating intermediate data in generating the machine data items;
grouping the machine data items into time-based data groupings, the time-based data groupings comprising a full data grouping that includes a first set of the machine data items and a first intermediate dataset of the intermediate data, the time-based data groupings further comprising a current data grouping in which a second set of the machine data items are stored;
generating a first data grouping batch hash in a first blockchain system, the first data grouping batch hash generated by combining a hash of the first set of machine data items with hashes of the first intermediate dataset, the hashes of the first intermediate dataset being further stored in a second blockchain system;
generating hashes of a second intermediate dataset of the intermediate data in the second blockchain system, the hashes of a second intermediate dataset being stored in the second blockchain system while the current data grouping is not full; and
generating a second data grouping batch hash in the first blockchain system in response to the current data grouping being full, the second data grouping batch hash generated by combining a hash of the second set of machine data items with the hashes of the second intermediate dataset.

18. The system of claim 17, wherein the first blockchain system is a public blockchain.

19. The system of claim 18, wherein the second blockchain system is a permissioned blockchain system managed by permissioned nodes.

20. A non-transitory machine-storage medium storing instructions that when executed by one or more hardware processors of a machine, cause the machine to perform operations comprising:
receiving, by one or more servers of a network platform, machine data items from one or more networked devices, the one or more networked devices generating intermediate data in generating the machine data items;
grouping the machine data items into time-based data groupings, the time-based data groupings comprising a full data grouping that includes a first set of the machine data items and a first intermediate dataset of the intermediate data, the time-based data groupings further comprising a current data grouping in which a second set of the machine data items are stored;
generating a first data grouping batch hash in a first blockchain system, the first data grouping batch hash generated by combining a hash of the first set of machine data items with hashes of the first intermediate dataset;
generating hashes of a second intermediate dataset of the intermediate data in a second blockchain system, the hashes of a second intermediate dataset being stored in the second blockchain system while the current data grouping is not full; and
generating a second data grouping batch hash in the first blockchain system in response to the current data grouping being full, the second data grouping batch hash generated by combining a hash of the second set of machine data items with the hashes of the second intermediate dataset.

\* \* \* \* \*